United States Patent
Wänstedt et al.

(10) Patent No.: US 12,556,956 B2
(45) Date of Patent: Feb. 17, 2026

(54) BEAM-BASED RADIO RESOURCE MANAGEMENT MEASUREMENT RELAXATION

(71) Applicant: Telefonaktiebolaget LM Ericsson (publ), Stockholm (SE)

(72) Inventors: Stefan Wänstedt, Luleå (SE); Yi-Ju Chen, Solna (SE); Andreas Höglund, Solna (SE); Tuomas Tirronen, Helsinki (FI)

(73) Assignee: Telefonaktiebolaget LM Ericsson (Publ), Stockholm (SE)

(*) Notice: Subject to any disclaimer, the term of this patent is extended or adjusted under 35 U.S.C. 154(b) by 333 days.

(21) Appl. No.: 18/260,413

(22) PCT Filed: Jan. 14, 2022

(86) PCT No.: PCT/SE2022/050042
§ 371 (c)(1),
(2) Date: Jul. 5, 2023

(87) PCT Pub. No.: WO2022/154741
PCT Pub. Date: Jul. 21, 2022

(65) Prior Publication Data
US 2024/0373269 A1    Nov. 7, 2024

Related U.S. Application Data

(60) Provisional application No. 63/137,461, filed on Jan. 14, 2021.

(51) Int. Cl.
*H04W 52/02*    (2009.01)
*H04W 24/10*    (2009.01)

(52) U.S. Cl.
CPC ....... *H04W 24/10* (2013.01); *H04W 52/0219* (2013.01)

(58) Field of Classification Search
CPC .............................. H04W 24/10; H04W 52/02
See application file for complete search history.

(56) References Cited

U.S. PATENT DOCUMENTS 12,273,756 B2 *    4/2025    Koskela ............ H04W 52/0245
2016/0360438 A1    12/2016    Yiu et al.
(Continued)

FOREIGN PATENT DOCUMENTS

| WO | 2017192889 A1 | 11/2017 |
| WO | 2019066559 A1 | 4/2019 |
| WO | 2020249199 A1 | 12/2020 |

OTHER PUBLICATIONS

International Search Report and Written Opinion dated Mar. 29, 2022 for International Application No. PCT/SE2022/050042 filed Jan. 14, 2022, consisting of 15-pages.
(Continued)

*Primary Examiner* — Michael T Vu
(74) *Attorney, Agent, or Firm* — Weisberg I.P. Law, P.A.

(57) ABSTRACT

According to some embodiments, a method performed by a wireless device includes monitoring a set of two or more strongest beams over a predefined time period, and based on an amount of change in the set of two or more strongest beams over the predefined time period, determining whether the wireless device is stationary or low-mobility. The method may further include relaxing a radio resource management (RRM) measurement configuration.

17 Claims, 10 Drawing Sheets

300

312 – monitor a set of two or more strongest beams over a predefined time period 314 – based on an amount of change in the set of two or more strongest beams over the predefined time period, determine whether the wireless device is stationary or low-mobility 316 – relax a radio resource management (RRM) measurement configuration

(56) References Cited

U.S. PATENT DOCUMENTS

2019/0253115 A1* 8/2019 Park ..................... H04W 16/28
2021/0352507 A1* 11/2021 He .................... H04W 52/0232

OTHER PUBLICATIONS

3GPP TS 38.304 V15.7.0; 3rd Generation Partnership Project; Technical Specification Group Radio Access Network; NR; User Equipment (UE) procedures in Idle mode and RRC Inactive state (Release 15); Jul. 2020, consisting of 30-pages.
3GPP TSG RAN Meeting #89e RP-201677 (revision of RP-191386); Title: Revised SID on Study on support of reduced capability NR devices; Agenda Item: 9.7.5; Source: Ericsson; Document for: Approval; Date and Location: Sep. 14-18, 2020, Electronic Meeting, consisting of 4-pages.
ETSI TS 138 133 V15.10.0; Technical Specification; 5G; NR; Requirements for support of radio resource management (3GPP TS 38.133 version 15.10.0 Release 15); Sep. 2020, consisting of 1163-pages.
ETSI TS 138 331 V15.10.0; Technical Specification; 5G; NR; Radio Resource Control (RRC); Protocol specification (3GPP TS 38.331 version 15.10.0 Release 15); Jul. 2020, consisting of 528-pages.
ETSI TS 138 101-1 V15.10.0; Technical Specification; 5G; NR; User Equipment (UE) radio transmission and reception; Part 1: Range 1 Standalone (3GPP TS 38.101-1 version 15.10.0 Release 15); Jul. 2020, consisting of 248-pages.

* cited by examiner

BEAM-BASED RADIO RESOURCE MANAGEMENT MEASUREMENT RELAXATION

CROSS-REFERENCE TO RELATED APPLICATIONS

This application is a Submission Under 35 U.S.C. § 371 for U.S. National Stage Patent Application of International Application No.: PCT/SE2022/050042, filed Jan. 14, 2022 entitled "BEAM-BASED RADIO RESOURCE MANAGEMENT MEASUREMENT RELAXATION," which claims priority to U.S. Provisional Application No.: 63/137,461, filed Jan. 14, 2021, entitled "BEAM-BASED RADIO RESOURCE MANAGEMENT MEASUREMENT RELAXATION," the entireties of both of which are incorporated herein by reference.

TECHNICAL FIELD

Embodiments of the present disclosure are directed to wireless communications and, more particularly, to beam-based radio resource management (RRM) measurement relaxation.

BACKGROUND

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features, and advantages of the enclosed embodiments will be apparent from the following description.

Third Generation Partnership Project (3GPP) new radio (NR) provides enhanced mobile broadband services (eMBB) and critical Machine Type Communication (cMTC), which is sometimes referred to as ultra-reliable and low latency communication (URLLC). These services are mainly targeted for high data rate, high reliability or low latency scenarios and require high user equipment (UE) performance and lead to high design cost/complexity. On top of these aspects, the design form factors are also required to be kept small. This makes it difficult for eMBB and URLLC devices to have long battery lifetime (i.e., from few days to few years).

To facilitate NR to be used for use cases with relaxed requirements, compared to the ones described in the previous paragraph, and long battery lifetime, 3GPP Release 17 includes a UE with reduced capability (RedCap). The RedCap UE type is particularly suited for machine type communication (MTC) services such as wireless sensors or video surveillance cameras, which are typically stationary and require a battery lifetime of a few years, and for MBB services with lower performance requirements and up to a few days battery lifetime expectancy, such as, wearables.

A RedCap UE is expected to spend more than 90% of its total time in RRC_IDLE/INACTIVE state. In RRC_IDLE/INACTIVE state radio resource management (RRM) measurement is one of the main factors that contributes to a significant portion of energy consumption in a UE.

The RRM measurements to be performed by the UE in NR includes both cell level and beam level measurements for serving cells and the neighbor cells in serving frequencies. RRC_IDLE/INACTIVE NR UEs are required to perform the RRM measurements for the serving cell every DRX cycle. Based on the serving cell qualities and the criteria defined in TS 38.304 Clause 5.2.4.2 (Release 15), the UE assesses whether to perform RRM measurement for the neighboring cells. An excerpt is included below.

5.2.3.2 Cell Selection Criterion

The cell selection criterion S is fulfilled when:

$$Srxlev > 0 \text{ AND } Squal > 0$$

where:

$$Srxlev = Q_{rxlevmeas} - (Q_{rxlevmin} + Q_{rxlevminoffset}) - P_{compensation} - Qoffset_{temp}$$

$$Squal = Q_{qualmeas} - (Q_{qualmin} + Q_{qualminoffset}) - Qoffset_{temp}$$

where:

| | |
|---|---|
| Srxlev | Cell selection RX level value (dB) |
| Squal | Cell selection quality value (dB) |
| $Qoffset_{temp}$ | Offset temporarily applied to a cell as specified in TS 38.331 (dB) |
| $Q_{rxlevmeas}$ | Measured cell RX level value (RSRP) |
| $Q_{qualmeas}$ | Measured cell quality value (RSRQ) |
| $Q_{rxlevmin}$ | Minimum required RX level in the cell (dBm). If the UE supports SUL frequency for this cell, Qrxlevmin is obtained from q-RxLevMinSUL, if present, in SIB1, SIB2 and SIB4, additionally, if $Q_{rxlevminoffsetcellSUL}$ is present in SIB3 and SIB4 for the concerned cell, this cell specific offset is added to the corresponding Qrxlevmin to achieve the required minimum RX level in the concerned cell; else Qrxlevmin is obtained from q-RxLevMin in SIB1, SIB2 and SIB4, additionally, if $Q_{rxlevminoffsetcell}$ is present in SIB3 and SIB4 for the concerned cell, this cell specific offset is added to the corresponding Qrxlevmin to achieve the required minimum RX level in the concerned cell. |
| $Q_{qualmin}$ | Minimum required quality level in the cell (dB). Additionally, if $Q_{qualminoffsetcell}$ is signalled for the concerned cell, this cell specific offset is added to achieve the required minimum quality level in the concerned cell. |
| $Q_{rxlevminoffset}$ | Offset to the signalled $Q_{rxlevmin}$ taken into account in the Srxlev evaluation as a result of a periodic search for a higher priority PLMN while camped normally in a VPLMN, as specified in TS 23.122. |
| $Q_{qualminoffset}$ | Offset to the signalled $Q_{qualmin}$ taken into account in the Squal evaluation as a result of a periodic search for a higher priority PLMN while camped normally in a VPLMN, as specified in TS 23.122. |
| $P_{compensation}$ | For FR1, if the UE supports the additionalPmax in the NR-NS-PmaxList, if present, in SIB1, SIB2 and SIB4: $\max(P_{EMAX1} - P_{PowerClass}, 0) - (\min(P_{EMAX2}, P_{PowerClass}) - \min(P_{EMAX1}, P_{PowerClass}))$ (dB); else: $\max(P_{EMAX1} - P_{PowerClass}, 0)$ (dB) For FR2, $P_{compensation}$ is set to 0. |

-continued

| | |
|---|---|
| $P_{EMAX1}$, $P_{EMAX2}$ | Maximum TX power level of a UE may use when transmitting on the uplink in the cell (dBm) defined as $P_{EMAX}$ in TS 38.101. If UE supports SUL frequency for this cell, $P_{EMAX1}$ and $P_{EMAX2}$ are obtained from the p-Max for SUL in SIB1 and NR-NS-PmaxList for SUL respectively in SIB1, SIB2 and SIB4 as specified in TS 38.331, else $P_{EMAX1}$ and $P_{EMAX2}$ are obtained from the p-Max and NR-NS-PmaxList respectively in SIB1, SIB2 and SIB4 for normal UL as specified in TS 38.331. |
| $P_{PowerClass}$ | Maximum RF output power of the UE (dBm) according to the UE power class as defined in TS 38.101-1. |

[ . . . ]

5.2.4.2 Measurement Rules for Cell Re-Selection

Following rules are used by the UE to limit needed measurements:

If the serving cell fulfils $Srxlev>S_{intraSearchP}$ and $Squal>S_{intraSearchQ}$, the UE may choose not to perform intra-frequency measurements.

Otherwise, the UE shall perform intra-frequency measurements.

The UE shall apply the following rules for NR inter-frequencies and inter-RAT frequencies which are indicated in system information and for which the UE has priority provided as defined in 5.2.4.1:

For a NR inter-frequency or inter-RAT frequency with a reselection priority higher than the reselection priority of the current NR frequency, the UE shall perform measurements of higher priority NR inter-frequency or inter-RAT frequencies according to TS 38.133.

For a NR inter-frequency with an equal or lower reselection priority than the reselection priority of the current NR frequency and for inter-RAT frequency with lower reselection priority than the reselection priority of the current NR frequency:

If the serving cell fulfils $Srxlev>S_{nonIntraSearch}$ and $Squal>S_{nonIntraSearchQ}$, the UE may choose not to perform measurements of NR inter-frequencies or inter-RAT frequency cells of equal or lower priority;

Otherwise, the UE shall perform measurements of NR inter-frequencies or inter-RAT frequency cells of equal or lower priority according to TS 38.133.

The measurement rules above may not be able to provide enough power saving especially for UEs with low mobility, i.e., UEs that do not move much. Release-16 includes additional RRM measurement allowing the UE to further reduce the amount of power consumed in RRM measurements in RRC_IDLE/INACTIVE state. The new measurement rules are given in TS 38.304 Clause 5.2.4.9.0 and the measurement criteria in TS 38.304 Clause 5.2.4.9.1 and 5.2.4.9.2. An excerpt is included below.

5.2.4.9.0 Relaxed Measurement Rules

When the UE is required to perform measurements of intra-frequency or NR inter-frequencies or inter-RAT frequency cells according to the measurement rules in clause 5.2.4.2:

if lowMobilityEvaluation is configured and cellEdgeEvaluation is not configured; and
if the UE has performed normal intra-frequency, NR inter-frequency, or inter-RAT frequency measurements for at least $T_{SearchDeltaP}$ after (re-) selecting a new cell; and
if the relaxed measurement criterion in clause 5.2.4.9.1 is fulfilled for a period of T SearchDeltaP:

the UE may choose to perform relaxed measurements for intra-frequency cells according to relaxation methods in clauses 4.2.2.9 in TS 38.133;
if the serving cell fulfils $Srxlev>S_{nonIntraSearch}$ and $Squal>S_{nonIntraSearchQ}$:
for any NR inter-frequency or inter-RAT frequency of higher priority, if less than 1 hour has passed since measurements of corresponding frequency cell(s) for cell (re-) selection were last performed; and,
if highPriorityMeasRelax is configured with value true:
the UE may choose not to perform measurement on this frequency cell(s);
else (i.e. the serving cell fulfils $Srxlev \leq S_{nonIntraSearchP}$ or $Squal \leq S_{nonIntraSearchQ}$):
the UE may choose to perform relaxed measurements for NR inter-frequency or inter-RAT frequency cells according to relaxation methods in clauses 4.2.2.10, and 4.2.2.11 in TS 38.133;
if cellEdgeEvaluation is configured and lowMobilityEvaluation is not configured; and
if the relaxed measurement criterion in clause 5.2.4.9.2 is fulfilled:
the UE may choose to perform relaxed measurements for intra-frequency cells according to relaxation methods in clauses 4.2.2.9 in TS 38.133;
if the serving cell fulfils $Srxlev \leq S_{nonIntraSearchP}$ or $Squal \leq S_{nonIntraSearchQ}$:
the UE may choose to perform relaxed measurements for NR inter-frequency or inter-RAT frequency cells according to relaxation methods in clauses 4.2.2.10, and 4.2.2.11 in TS 38.133;
if both lowMobilityEvaluation and cellEdgeEvaluation are configured:
if the UE has performed normal intra-frequency, NR inter-frequency, or inter-RAT frequency measurements for at least $T_{SearchDeltaP}$ after (re-) selecting a new cell; and
if the relaxed measurement criterion in clause 5.2.4.9.1 is fulfilled for a period of $T_{SearchDeltaP}$; and
if the relaxed measurement criterion in clause 5.2.4.9.2 is fulfilled:
for any intra-frequency, NR inter-frequency, or inter-RAT frequency, if less than 1 hour has passed since measurements of corresponding frequency cell(s) for cell (re-) selection were last performed:
the UE may choose not to perform measurement for measurements on this frequency cell(s);
else:
if the UE has performed normal intra-frequency, NR inter-frequency, or inter-RAT frequency measurements for at least $T_{SearchDeltaP}$ after (re-) selecting a new cell, and the relaxed measurement criterion in clause 5.2.4.9.1 is fulfilled for a period of T SearchDeltaP; Or,
if the relaxed measurement criterion in clause 5.2.4.9.2 is fulfilled:
if combineRelaxedMeasCondition is not configured:
the UE may choose to perform relaxed measurements for intra-frequency, NR inter-frequency cells of equal or lower priority, or inter-RAT frequency cells of equal or lower priority according to relaxation methods in clauses 4.2.2.9, 4.2.2.10, and 4.2.2.11 in TS 38.133;
if the serving cell fulfils $Srxlev \leq S_{nonIntraSearchP}$ or $Squal \leq S_{nonIntraSearchQ}$:
the UE may choose to perform relaxed measurement for NR inter-frequency cells of higher priority, or inter- RAT frequency cells of higher priority according to relaxation methods in clauses 4.2.2.10, and 4.2.2.11 in TS 38.133;

The above relaxed measurements and no measurement are not applicable for frequencies that are included in VarMeasIdleConfig, if configured and for which the UE supports dual connectivity or carrier aggregation between those frequencies and the frequency of the current serving cell.

5.2.4.9.1 Relaxed Measurement Criterion for UE with Low Mobility

The relaxed measurement criterion for UE with low mobility is fulfilled when:

$$(Srxlev_{Ref} - Srxlev) < S_{SearchDeltaP},$$

Where:
Srxlev=current Srxlev value of the serving cell (dB).
$Srxlev_{Ref}$=reference Srxlev value of the serving cell (dB), set as follows:
After selecting or reselecting a new cell, or
If (Srxlev−SrxlevRet)>0, or
If the relaxed measurement criterion has not been met for $T_{SearchDeltaP}$.
The UE shall set the value of $Srxlev_{Ref}$ to the current Srxlev value of the serving cell.

5.2.4.9.2 Relaxed Measurement Criterion for UE not at Cell Edge

The relaxed measurement criterion for UE not at cell edge is fulfilled when:
Srxlev>$S_{SearchThresholdP}$, and,
Squal>$S_{SearchThresholdQ}$, if $S_{SearchThresholdQ}$ is configured,
Where:
Srxlev=current Srxlev value of the serving cell (dB).
Squal=current Squal value of the serving cell (dB).

There currently exist certain challenges with beam-based radio resource management (RRM) measurement relaxation. For example, current NR measurements for RRM measurement relaxation criteria are based on cell level reference signal received power (RSRP) measurements. In NR, a cell can be configured with more than one synchronization signal (SS)-block (i.e., SSB beams) and the cell-level RSRP measurements are derived by taking the average of beam-level RSRP measurements of configured SSB beams in IDLE/INACTIVE state. Until NR Release-16, only SSBs are configured in IDLE/INACTIVE states, but this does not exclude the possibilities of using CSI-RS for RRM measurements in RRC IDLE/INACTIVE state.

RSRP measurements are an indication of the received power between a gNB and a UE (corresponding to radial distance with, e.g., free space path loss). Such measurements are not sufficient to determine the stationary status of a UE if the UE circles around the gNB.

Furthermore, having different beams covering different small sections within a cell, the RSRP variations versus the radial distance between the gNB and the UE may not be as distinct compared to when a cell is only configured with one beam. This situation may be especially true in line-of-sight scenarios and the RRM measurements based on RSRP may be difficult to detect a UE mobility status and becomes even more difficult to classify UEs as low-mobility or stationery UEs.

SUMMARY

Based on the description above, certain challenges currently exist with beam-based radio resource management (RRM) measurement relaxation. Certain aspects of the present disclosure and their embodiments may provide solutions to these or other challenges.

Particular embodiments facilitate enhanced RRM measurement relaxation in RRC_IDLE/INACTIVE state for stationary RedCap/eMBB devices. Particular embodiments include beam-based measurement criteria and rules to provide better classification of a UE's location and mobility, thus facilitating a higher level of RRM measurement relaxations for the UEs.

According to some embodiments, a method performed by a wireless device comprises: monitoring a set of two or more strongest beams (or neighbor cells) over a predefined time period; and based on an amount of change in the set of two or more strongest beams (or neighbor cells) over the predefined time period, determining whether the wireless device is stationary or low-mobility.

In particular embodiments, upon determining the wireless device is stationary or low-mobility, the method further comprises relaxing a RRM measurement configuration.

In particular embodiments, the change in the set of two or more strongest beams (or neighbor cells) refers to a change in the strongest beams (or neighbor cells) over the predetermined time period, a change in the ordering of the strongest beams (or neighbor cells) over the predetermined time period, a change in the signal strength of the strongest beams (or neighbor cells) over the predetermined time period, or a change in antenna panels used by the wireless device over the predetermined time period.

In particular embodiments, the wireless device comprises a reduced capacity wireless device.

According to some embodiments, a wireless device comprises processing circuitry operable to perform any of the wireless device methods described above.

Also disclosed is a computer program product comprising a non-transitory computer readable medium storing computer readable program code, the computer readable program code operable, when executed by processing circuitry to perform any of the methods performed by the wireless devices described above.

Certain embodiments may provide one or more of the following technical advantages. For example, one advantage of particular embodiments is reducing UE energy consumption for stationary devices and thus achieving even longer battery life for RedCap UEs and other devices. This may be achieved through better and/or faster classification of the UE's status.

BRIEF DESCRIPTION OF THE DRAWINGS

For a more complete understanding of the disclosed embodiments and their features and advantages, reference is now made to the following description, taken in conjunction with the accompanying drawings, in which.

DETAILED DESCRIPTION

Figure 1:
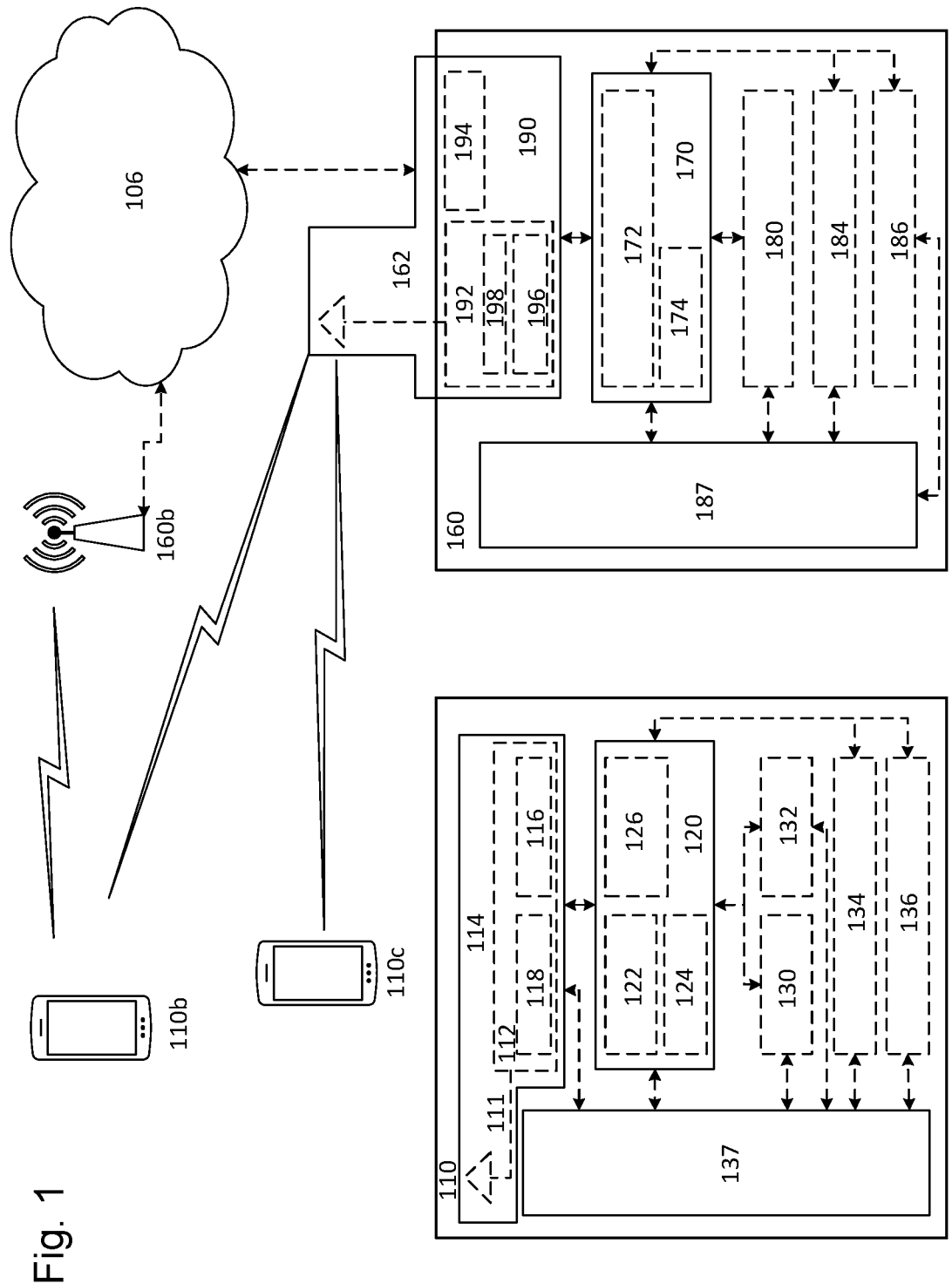
FIG. 1 is a block diagram illustrating an example wireless network.

As described above, certain challenges currently exist with beam-based radio resource management (RRM) measurement relaxation. Certain aspects of the present disclosure and their embodiments may provide solutions to these or other challenges. Particular embodiments facilitate enhanced RRM measurement relaxation in RRC_IDLE/INACTIVE state for stationary RedCap/eMBB devices. Particular embodiments include beam-based measurement criteria and rules to provide better classification of a UE's location and mobility, thus facilitating a higher level of RRM measurement relaxations for the UEs.

Particular embodiments are described more fully with reference to the accompanying drawings. Other embodiments, however, are contained within the scope of the subject matter disclosed herein, the disclosed subject matter should not be construed as limited to only the embodiments set forth herein; rather, these embodiments are provided by way of example to convey the scope of the subject matter to those skilled in the art.

In Third Generation Partnership Project (3GPP) new radio (NR), currently a user equipment (UE) uses the criteria ($Srxlev_{Ref}$−Srxlev)<$S_{SearchDeltaP}$ (in RRC_IDLE or RRC_INACTIVE) to assess whether it is in a low mobility state (which allows the UE to relax RRM measurements in time to save power). Srxlev is defined as follows in TS 38.304 and is RSRP-based and prone to the above problems: Srxlev=$Q_{rxlevmeas}$−($Q_{rxlevmin}$+$Q_{rxlevminoffset}$)−$P_{compensation}$−Qoffset$_{temp}$, where $Q_{rxlevmeas}$ is the measured cell RX level value (RSRP).

Particular embodiments provide example methods with new criteria for a UE to determine it is in a "stationary" mobility state (or RedCap mobility state) in different ways compared to the existing criteria for "low-mobility" or "not at cell-edge" states. The "stationary" state corresponds to a UE staying immobile, fixed in the same physical location. Even in such case the RSRP measurement result may still change or fluctuate because of, for example, changes in radio environment, weather, etc.

Particular embodiments may be used by the network to configure even more relaxed RRM monitoring rules, e.g., by increasing the time the UE is inferring its status as "stationary" or by reducing the number of SSB beams the UE must measure. This can save power because when stationary the UE may use the most relaxed measurement setup or be configured by the network to measure more infrequently. Consequently, the UE does not have to monitor/measure for serving and/or neighboring cells, or in some cases the UE does not have to measure on unnecessary beams and/or to monitor for neighboring cells.

In a first group of embodiments, the UE is configured to monitor the n strongest beams (referred to as the set of beams '$Beams_n$') to determine the stationary state and the m strongest beams (referred to as the set of beams '$Beams_m$') to determine the low-mobility state, where m>=n. To distinguish between the stationary and low-mobility state, the criteria can be set as if less than x beams (given by the number $nBeams_{SearchDeltaP\_stationary}$) changed within the set of n beams monitored within a predefined time period, e.g. $T_{searchDelta\_beams\_stationary}$, the UE can be considered "stationary":

$Nr$ of beams differing in the sets ($Beams_{Ref\_n}$) and ($Beams_n$) <     [eq. 1]

$nBeams_{SearchDeltaP\_stationary}$ for at least $T_{searchDelta\_beams\_stationary}$ Similarly, the corresponding beam-based criteria may be set for low-mobility states:

$Nr$ of beams differing in the sets ($Beams_{Ref\_m}$) and ($Beams_m$) <     [eq. 2]

$nBeams_{SearchDeltaP\_lowMobility}$ for at least $T_{searchDelta\_beams\_lowMobility}$ Where $T_{searchDelta\_beams\_stationary}$ can be set to >= $T_{searchDelta\_beams\_lowMobility}$, and $Beams_{Ref\_i}$ is the reference set of strongest beams stored in UE in the respective case. The reference set should be updated, e.g., when the strongest beams in the new measurements differ from the previous determined reference set.

The number of beams the UE should consider for measurement, n and m respectively, may be semi-statically configured in system information, either as a common configuration for all UEs or specifically configured for a group of UEs, e.g. UEs of RedCap device type. Alternatively, the number of beams may be configured via dedicated signaling, e.g. radio resource control (RRC) signaling, if applicable to RRC_INACTIVE or RRC_CONNECTED states. Alternatively, the number may be hard-coded in a specification.

These embodiments may be used in combination with RSRP based methods (e.g., legacy methods, possibly with other parameter values) to have added criteria to also detect radial motion for the UE. In this case, the UE should consider itself to be in "stationary" state and allowed to relax RRM measurements accordingly if both the RSRP criteria and the change in the set of strongest beam criteria in these embodiments are met.

In some embodiments, the ranking of the strongest beams in the beam set is used as the criteria. That is, even in the set of strongest beams '$Beams_n$' contain the same number of beams before and after the evaluation time $T_{searchDelta\_beams\_stationary}$, the UE should only consider itself to be in "stationary" state and allowed to relax RRM measurements accordingly if the order of the strongest beams is the same (e.g., if a new beam is $2^{nd}$ strongest after the evaluation period, the UE could not consider itself to be in "stationary" state).

In some embodiments, the set of the beams needs to be the same to consider the UE "stationary", i.e. if the number n is the same between two measurements, but the set of measured SSB/beams is different, the UE is not considered stationary. Such is the case, for example, when the lowest ranked beam is changed in the set of measured beams.

In a second group of embodiments, in relation to the first group of embodiments, the UE may be additionally provided with a beam based delta RSRP to check for intra-beam mobility. For example, the strongest beam N1 remains the strong beam over $T_{searchDelta\_beams\_stationary}$ and the d $RSRP_{beam\_N1}$)=$RSRP_{beam\_N1\_T0}$−$RSRP_{beam\_N1\_T1}$<$RSRP_{beam\_threshold}$.

In a third group of embodiments, a UE may be a multi-panel UE where each antenna panel has its own beamforming pointing towards different directions. If a UE detects that there is change of antenna panels after the initial attach to the network and/or less than a preconfigured period, the UE may not be declared stationary.

In some embodiments, the UE determines whether it is stationary based on one or a combination of two or more of the above methods or combined with the existing cell-based RSRP methods defined in TS 38.304.

In some embodiments, the new criteria may be adapted for RRM measurements in RRC_CONNECTED state.

In a fourth group of embodiments, SIBx includes different settings for RRC_IDLE and RRC_INACTIVE; at least if serving cell relaxation is added to the specification. This is to provide differentiation for use cases that may be affected by the relaxation. One example is small data transmissions using 2-step RACH or 4-step RACH. When small data transmissions are transmitted by RedCap UEs, serving cell relaxation in INACTIVE state will not be ideal as it is not possible to know beforehand if a UE will execute small data transmission in msgA or msg3. If small data transmissions are enabled, because the device will most of the time camp in the RRC_INACTIVE state, the level of relaxation may be different from RRC_IDLE to better control the small data transmission.

In a fifth group of embodiments, RSRP based criteria for determining the mobility state is complemented by a set of the strongest neighbor cells (instead of beams) to detect radial movement of the UE. Strongest cells are, e.g., determined by measuring (see 5.2.3.2 in 38.304):

$$Srxlev = Q_{rxlevmeas} - (Q_{rxlevmin} + Q_{rxlevminoffset}) - P_{compensation} - Qoffset_{temp}$$

$$Squal = Q_{qualmeas} - (Q_{qualmin} + Q_{qualminoffset}) - Qoffset_{temp}$$

The UE is configured to monitor the k strongest neighbor cells (referred to as the set of cells '$Cells_k$') to determine if the UE can be considered to be in "stationary" state and apply RRM measurement relaxations accordingly. To determine the stationary status, the criteria can be set as if less than w neighbor cells (given by the number $nCells_{SearchDeltaP\_stationary}$) changed within the set of n beams monitored within a predefined time period, e.g. $T_{searchDelta\_beams\_stationary}$:

$Nr$ or cells differing in the sets ($Cells_{Ref\_n}$) and ($Cells_n$) < [eq. 3]

$nCells_{SearchDeltaP\_stationary}$ for at least $T_{searchDelta\_beams\_stationary}$ $Cells_{Ref\_n}$ is the reference set of strongest neighbor cells stored in the UE.

The number of cells the UE should consider for measurement n can be semi-statically configured in system information, either as a common configuration for all UEs or specifically for a group of UEs, e.g. UEs of RedCap device type. Alternatively, the number of cells may be configured via dedicated signaling, e.g. RRC signaling, if applicable to RRC_INACTIVE or RRC_CONNECTED states. Alternatively, the number may be hard-coded in a specification.

These embodiments may be used in combination with RSRP based methods (e.g., legacy methods, possibly with other parameter values) to have added criteria to also detect radial motion for the UE. In this case, the UE should consider itself to be in "stationary" state and allowed to relax RRM measurements accordingly if both the RSRP criteria and the change in the set of strongest cell criteria in these embodiments are met.

In some embodiments, the ranking of the strongest cells in the cell set is used as the criteria. That is, even in the set of strongest cells '$Cells_n$' contain the same number of cells before and after the evaluation time $T_{searchDelta\_beams\_stationary}$, the UE should only consider itself to be in "stationary" state and allowed to relax RRM measurements accordingly if the order of the strongest cells is the same (e.g., if a new cell is $2^{nd}$ strongest after the evaluation period, the UE could not consider itself to be in "stationary" state).

In some embodiments, the set of the cells needs to be the same to consider the UE "stationary," i.e. if the number n is the same between two measurements, but the set of measured cells (e.g., cell based on cell ID) is different, the UE is not considered stationary. Such would be the case, for example, when the lowest ranked cell is changed in the set of measured cells.

In some embodiments, in relation to the relaxation measurement rules in section 5.2.4.9.0 in 38.304, the "stationary" state is not (only) associated with RRM measurement relaxations in time, but in other dimensions such as a lower number of beams or neighbor cells the UE should report. Combined rules of particular embodiments described herein and the existing measurement rules are not precluded.

FIG. 1 illustrates an example wireless network, according to certain embodiments. The wireless network may comprise and/or interface with any type of communication, telecommunication, data, cellular, and/or radio network or other similar type of system. In some embodiments, the wireless network may be configured to operate according to specific standards or other types of predefined rules or procedures. Thus, particular embodiments of the wireless network may implement communication standards, such as Global System for Mobile Communications (GSM), Universal Mobile Telecommunications System (UMTS), Long Term Evolution (LTE), and/or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WiMax), Bluetooth, Z-Wave and/or ZigBee standards. Network 106 may operate in licensed spectrum, unlicensed spectrum, or a combination of licensed and unlicensed spectrum.

Network 106 may comprise one or more backhaul networks, core networks, IP networks, public switched telephone networks (PSTNs), packet data networks, optical networks, wide-area networks (WANs), local area networks (LANs), wireless local area networks (WLANs), wired networks, wireless networks, metropolitan area networks, and other networks to enable communication between devices.

Network node 160 and WD 110 comprise various components described in more detail below. These components work together to provide network node and/or wireless device functionality, such as providing wireless connections in a wireless network. In different embodiments, the wireless network may comprise any number of wired or wireless networks, network nodes, base stations, controllers, wireless devices, relay stations, and/or any other components or systems that may facilitate or participate in the communication of data and/or signals whether via wired or wireless connections.

As used herein, network node refers to equipment capable, configured, arranged and/or operable to communicate directly or indirectly with a wireless device and/or with other network nodes or equipment in the wireless network to enable and/or provide wireless access to the wireless device and/or to perform other functions (e.g., administration) in the wireless network.

Examples of network nodes include, but are not limited to, access points (APs) (e.g., radio access points), base stations (BSs) (e.g., radio base stations, Node Bs, evolved Node Bs (eNBs) and NR NodeBs (gNBs)). Base stations may be categorized based on the amount of coverage they provide (or, stated differently, their transmit power level) and may then also be referred to as femto base stations, pico base stations, micro base stations, or macro base stations. A base station may be a relay node or a relay donor node controlling a relay. A network node may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS). Yet further examples of network nodes include multi-standard radio (MSR) equipment such as MSR BSs, network controllers such as radio network controllers (RNCs) or base station controllers (BSCs), base transceiver stations (BTSs), transmission points, transmission nodes, multi-cell/multicast coordination entities (MCEs), core network nodes (e.g., MSCs, MMEs), O&M nodes, OSS nodes, SON nodes, positioning nodes (e.g., E-SMLCs), and/or MDTs.

As another example, a network node may be a virtual network node as described in more detail below. More generally, however, network nodes may represent any suitable device (or group of devices) capable, configured, arranged, and/or operable to enable and/or provide a wireless device with access to the wireless network or to provide some service to a wireless device that has accessed the wireless network.

In FIG. 1, network node 160 includes processing circuitry 170, device readable medium 180, interface 190, auxiliary equipment 184, power source 186, power circuitry 187, and antenna 162. Although network node 160 illustrated in the example wireless network of FIG. 1 may represent a device that includes the illustrated combination of hardware components, other embodiments may comprise network nodes with different combinations of components.

It is to be understood that a network node comprises any suitable combination of hardware and/or software needed to perform the tasks, features, functions and methods disclosed herein. Moreover, while the components of network node 160 are depicted as single boxes located within a larger box, or nested within multiple boxes, in practice, a network node may comprise multiple different physical components that make up a single illustrated component (e.g., device readable medium 180 may comprise multiple separate hard drives as well as multiple RAM modules).

Similarly, network node 160 may be composed of multiple physically separate components (e.g., a NodeB component and a RNC component, or a BTS component and a BSC component, etc.), which may each have their own respective components. In certain scenarios in which network node 160 comprises multiple separate components (e.g., BTS and BSC components), one or more of the separate components may be shared among several network nodes. For example, a single RNC may control multiple NodeB's. In such a scenario, each unique NodeB and RNC pair, may in some instances be considered a single separate network node.

In some embodiments, network node 160 may be configured to support multiple radio access technologies (RATs). In such embodiments, some components may be duplicated (e.g., separate device readable medium 180 for the different RATs) and some components may be reused (e.g., the same antenna 162 may be shared by the RATs). Network node 160 may also include multiple sets of the various illustrated components for different wireless technologies integrated into network node 160, such as, for example, GSM, WCDMA, LTE, NR, WiFi, or Bluetooth wireless technologies. These wireless technologies may be integrated into the same or different chip or set of chips and other components within network node 160.

Processing circuitry 170 is configured to perform any determining, calculating, or similar operations (e.g., certain obtaining operations) described herein as being provided by a network node. These operations performed by processing circuitry 170 may include processing information obtained by processing circuitry 170 by, for example, converting the obtained information into other information, comparing the obtained information or converted information to information stored in the network node, and/or performing one or more operations based on the obtained information or converted information, and as a result of said processing making a determination.

Processing circuitry 170 may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node 160 components, such as device readable medium 180, network node 160 functionality.

For example, processing circuitry 170 may execute instructions stored in device readable medium 180 or in memory within processing circuitry 170. Such functionality may include providing any of the various wireless features, functions, or benefits discussed herein. In some embodiments, processing circuitry 170 may include a system on a chip (SOC).

In some embodiments, processing circuitry 170 may include one or more of radio frequency (RF) transceiver circuitry 172 and baseband processing circuitry 174. In some embodiments, radio frequency (RF) transceiver circuitry 172 and baseband processing circuitry 174 may be on separate chips (or sets of chips), boards, or units, such as radio units and digital units. In alternative embodiments, part or all of RF transceiver circuitry 172 and baseband processing circuitry 174 may be on the same chip or set of chips, boards, or units In certain embodiments, some or all of the functionality described herein as being provided by a network node, base station, eNB or other such network device may be performed by processing circuitry 170 executing instructions stored on device readable medium 180 or memory within processing circuitry 170. In alternative embodiments, some or all of the functionality may be provided by processing circuitry 170 without executing instructions stored on a separate or discrete device readable medium, such as in a hard-wired manner. In any of those embodiments, whether executing instructions stored on a device readable storage medium or not, processing circuitry 170 can be configured to perform the described functionality. The benefits provided by such functionality are not limited to processing circuitry 170 alone or to other components of network node 160 but are enjoyed by network node 160 as a whole, and/or by end users and the wireless network generally.

Device readable medium 180 may comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that may be used by processing circuitry 170. Device readable medium 180 may store any suitable instructions, data or information, including a computer program, software, an application including one or more of logic, rules, code, tables, etc. and/or other instructions capable of being executed by processing circuitry 170 and, utilized by network node 160. Device readable medium 180 may be used to store any calculations made by processing circuitry 170 and/or any data received via interface 190. In some embodiments, processing circuitry 170 and device readable medium 180 may be considered to be integrated.

Interface 190 is used in the wired or wireless communication of signaling and/or data between network node 160, network 106, and/or WDs 110. As illustrated, interface 190 comprises port(s)/terminal(s) 194 to send and receive data, for example to and from network 106 over a wired connection. Interface 190 also includes radio front end circuitry 192 that may be coupled to, or in certain embodiments a part of, antenna 162.

Radio front end circuitry 192 comprises filters 198 and amplifiers 196. Radio front end circuitry 192 may be connected to antenna 162 and processing circuitry 170. Radio front end circuitry may be configured to condition signals communicated between antenna 162 and processing circuitry 170. Radio front end circuitry 192 may receive digital data that is to be sent out to other network nodes or WDs via a wireless connection. Radio front end circuitry 192 may convert the digital data into a radio signal having the appropriate channel and bandwidth parameters using a combination of filters 198 and/or amplifiers 196. The radio signal may then be transmitted via antenna 162. Similarly, when receiving data, antenna 162 may collect radio signals which are then converted into digital data by radio front end circuitry 192. The digital data may be passed to processing circuitry 170. In other embodiments, the interface may comprise different components and/or different combinations of components.

In certain alternative embodiments, network node 160 may not include separate radio front end circuitry 192, instead, processing circuitry 170 may comprise radio front end circuitry and may be connected to antenna 162 without separate radio front end circuitry 192. Similarly, in some embodiments, all or some of RF transceiver circuitry 172 may be considered a part of interface 190. In still other embodiments, interface 190 may include one or more ports or terminals 194, radio front end circuitry 192, and RF transceiver circuitry 172, as part of a radio unit (not shown), and interface 190 may communicate with baseband processing circuitry 174, which is part of a digital unit (not shown).

Antenna 162 may include one or more antennas, or antenna arrays, configured to send and/or receive wireless signals. Antenna 162 may be coupled to radio front end circuitry 190 and may be any type of antenna capable of transmitting and receiving data and/or signals wirelessly. In some embodiments, antenna 162 may comprise one or more omni-directional, sector or panel antennas operable to transmit/receive radio signals between, for example, 2 GHz and 66 GHz. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line. In some instances, the use of more than one antenna may be referred to as MIMO. In certain embodiments, antenna 162 may be separate from network node 160 and may be connectable to network node 160 through an interface or port.

Antenna 162, interface 190, and/or processing circuitry 170 may be configured to perform any receiving operations and/or certain obtaining operations described herein as being performed by a network node. Any information, data and/or signals may be received from a wireless device, another network node and/or any other network equipment. Similarly, antenna 162, interface 190, and/or processing circuitry 170 may be configured to perform any transmitting operations described herein as being performed by a network node. Any information, data and/or signals may be transmitted to a wireless device, another network node and/or any other network equipment.

Power circuitry 187 may comprise, or be coupled to, power management circuitry and is configured to supply the components of network node 160 with power for performing the functionality described herein. Power circuitry 187 may receive power from power source 186. Power source 186 and/or power circuitry 187 may be configured to provide power to the various components of network node 160 in a form suitable for the respective components (e.g., at a voltage and current level needed for each respective component). Power source 186 may either be included in, or external to, power circuitry 187 and/or network node 160. For example, network node 160 may be connectable to an external power source (e.g., an electricity outlet) via an input circuitry or interface such as an electrical cable, whereby the external power source supplies power to power circuitry 187. As a further example, power source 186 may comprise a source of power in the form of a battery or battery pack which is connected to, or integrated in, power circuitry 187. The battery may provide backup power should the external power source fail. Other types of power sources, such as photovoltaic devices, may also be used.

Alternative embodiments of network node 160 may include additional components beyond those shown in FIG. 1 that may be responsible for providing certain aspects of the network node's functionality, including any of the functionality described herein and/or any functionality necessary to support the subject matter described herein. For example, network node 160 may include user interface equipment to allow input of information into network node 160 and to allow output of information from network node 160. This may allow a user to perform diagnostic, maintenance, repair, and other administrative functions for network node 160.

As used herein, wireless device (WD) refers to a device capable, configured, arranged and/or operable to communicate wirelessly with network nodes and/or other wireless devices. Unless otherwise noted, the term WD may be used interchangeably herein with user equipment (UE). Communicating wirelessly may involve transmitting and/or receiving wireless signals using electromagnetic waves, radio waves, infrared waves, and/or other types of signals suitable for conveying information through air.

In some embodiments, a WD may be configured to transmit and/or receive information without direct human interaction. For instance, a WD may be designed to transmit information to a network on a predetermined schedule, when triggered by an internal or external event, or in response to requests from the network.

Examples of a WD include, but are not limited to, a smart phone, a mobile phone, a cell phone, a voice over IP (VoIP) phone, a wireless local loop phone, a desktop computer, a personal digital assistant (PDA), a wireless cameras, a gaming console or device, a music storage device, a playback appliance, a wearable terminal device, a wireless endpoint, a mobile station, a tablet, a laptop, a laptop-embedded equipment (LEE), a laptop-mounted equipment (LME), a smart device, a wireless customer-premise equipment (CPE). a vehicle-mounted wireless terminal device, etc. A WD may support device-to-device (D2D) communication, for example by implementing a 3GPP standard for sidelink communication, vehicle-to-vehicle (V2V), vehicle-to-infrastructure (V2I), vehicle-to-everything (V2X) and may in this case be referred to as a D2D communication device.

As yet another specific example, in an Internet of Things (IoT) scenario, a WD may represent a machine or other device that performs monitoring and/or measurements and transmits the results of such monitoring and/or measurements to another WD and/or a network node. The WD may in this case be a machine-to-machine (M2M) device, which may in a 3GPP context be referred to as an MTC device. As one example, the WD may be a UE implementing the 3GPP narrow band internet of things (NB-IoT) standard. Examples of such machines or devices are sensors, metering devices such as power meters, industrial machinery, or home or personal appliances (e.g. refrigerators, televisions, etc.) personal wearables (e.g., watches, fitness trackers, etc.).

In other scenarios, a WD may represent a vehicle or other equipment that is capable of monitoring and/or reporting on its operational status or other functions associated with its operation. A WD as described above may represent the endpoint of a wireless connection, in which case the device may be referred to as a wireless terminal. Furthermore, a WD as described above may be mobile, in which case it may also be referred to as a mobile device or a mobile terminal.

As illustrated, wireless device 110 includes antenna 111, interface 114, processing circuitry 120, device readable medium 130, user interface equipment 132, auxiliary equipment 134, power source 136 and power circuitry 137. WD 110 may include multiple sets of one or more of the illustrated components for different wireless technologies supported by WD 110, such as, for example, GSM, WCDMA, LTE, NR, WiFi, WiMAX, or Bluetooth wireless technologies, just to mention a few. These wireless technologies may be integrated into the same or different chips or set of chips as other components within WD 110.

Antenna 111 may include one or more antennas or antenna arrays, configured to send and/or receive wireless signals, and is connected to interface 114. In certain alternative embodiments, antenna 111 may be separate from WD 110 and be connectable to WD 110 through an interface or port. Antenna 111, interface 114, and/or processing circuitry 120 may be configured to perform any receiving or transmitting operations described herein as being performed by a WD. Any information, data and/or signals may be received from a network node and/or another WD. In some embodiments, radio front end circuitry and/or antenna 111 may be considered an interface.

As illustrated, interface 114 comprises radio front end circuitry 112 and antenna 111. Radio front end circuitry 112 comprise one or more filters 118 and amplifiers 116. Radio front end circuitry 114 is connected to antenna 111 and processing circuitry 120 and is configured to condition signals communicated between antenna 111 and processing circuitry 120. Radio front end circuitry 112 may be coupled to or a part of antenna 111. In some embodiments, WD 110 may not include separate radio front end circuitry 112; rather, processing circuitry 120 may comprise radio front end circuitry and may be connected to antenna 111. Similarly, in some embodiments, some or all of RF transceiver circuitry 122 may be considered a part of interface 114. Radio front end circuitry 112 may receive digital data that is to be sent out to other network nodes or WDs via a wireless connection. Radio front end circuitry 112 may convert the digital data into a radio signal having the appropriate channel and bandwidth parameters using a combination of filters 118 and/or amplifiers 116. The radio signal may then be transmitted via antenna 111. Similarly, when receiving data, antenna 111 may collect radio signals which are then converted into digital data by radio front end circuitry 112. The digital data may be passed to processing circuitry 120. In other embodiments, the interface may comprise different components and/or different combinations of components.

Processing circuitry 120 may comprise a combination of one or more of a microprocessor, controller, microcontroller, central processing unit, digital signal processor, application-specific integrated circuit, field programmable gate array, or any other suitable computing device, resource, or combination of hardware, software, and/or encoded logic operable to provide, either alone or in conjunction with other WD 110 components, such as device readable medium 130, WD 110 functionality. Such functionality may include providing any of the various wireless features or benefits discussed herein. For example, processing circuitry 120 may execute instructions stored in device readable medium 130 or in memory within processing circuitry 120 to provide the functionality disclosed herein.

As illustrated, processing circuitry 120 includes one or more of RF transceiver circuitry 122, baseband processing circuitry 124, and application processing circuitry 126. In other embodiments, the processing circuitry may comprise different components and/or different combinations of components. In certain embodiments processing circuitry 120 of WD 110 may comprise a SOC. In some embodiments, RF transceiver circuitry 122, baseband processing circuitry 124, and application processing circuitry 126 may be on separate chips or sets of chips.

In alternative embodiments, part or all of baseband processing circuitry 124 and application processing circuitry 126 may be combined into one chip or set of chips, and RF transceiver circuitry 122 may be on a separate chip or set of chips. In still alternative embodiments, part or all of RF transceiver circuitry 122 and baseband processing circuitry 124 may be on the same chip or set of chips, and application processing circuitry 126 may be on a separate chip or set of chips. In yet other alternative embodiments, part or all of RF transceiver circuitry 122, baseband processing circuitry 124, and application processing circuitry 126 may be combined in the same chip or set of chips. In some embodiments, RF transceiver circuitry 122 may be a part of interface 114. RF transceiver circuitry 122 may condition RF signals for processing circuitry 120.

In certain embodiments, some or all of the functionality described herein as being performed by a WD may be provided by processing circuitry 120 executing instructions stored on device readable medium 130, which in certain embodiments may be a computer-readable storage medium. In alternative embodiments, some or all of the functionality may be provided by processing circuitry 120 without executing instructions stored on a separate or discrete device readable storage medium, such as in a hard-wired manner.

In any of those embodiments, whether executing instructions stored on a device readable storage medium or not, processing circuitry 120 can be configured to perform the described functionality. The benefits provided by such functionality are not limited to processing circuitry 120 alone or to other components of WD 110, but are enjoyed by WD 110, and/or by end users and the wireless network generally.

Processing circuitry 120 may be configured to perform any determining, calculating, or similar operations (e.g., certain obtaining operations) described herein as being performed by a WD. These operations, as performed by processing circuitry 120, may include processing information obtained by processing circuitry 120 by, for example, converting the obtained information into other information, comparing the obtained information or converted information to information stored by WD 110, and/or performing one or more operations based on the obtained information or converted information, and as a result of said processing making a determination.

Device readable medium 130 may be operable to store a computer program, software, an application including one or more of logic, rules, code, tables, etc. and/or other instructions capable of being executed by processing circuitry 120. Device readable medium 130 may include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or any other volatile or non-volatile, non-transitory device readable and/or computer executable memory devices that store information, data, and/or instructions that may be used by processing circuitry 120. In some embodiments, processing circuitry 120 and device readable medium 130 may be integrated.

User interface equipment 132 may provide components that allow for a human user to interact with WD 110. Such interaction may be of many forms, such as visual, audial, tactile, etc. User interface equipment 132 may be operable to produce output to the user and to allow the user to provide input to WD 110. The type of interaction may vary depending on the type of user interface equipment 132 installed in WD 110. For example, if WD 110 is a smart phone, the interaction may be via a touch screen; if WD 110 is a smart meter, the interaction may be through a screen that provides usage (e.g., the number of gallons used) or a speaker that provides an audible alert (e.g., if smoke is detected). User interface equipment 132 may include input interfaces, devices and circuits, and output interfaces, devices and circuits. User interface equipment 132 is configured to allow input of information into WD 110 and is connected to processing circuitry 120 to allow processing circuitry 120 to process the input information. User interface equipment 132 may include, for example, a microphone, a proximity or other sensor, keys/buttons, a touch display, one or more cameras, a USB port, or other input circuitry. User interface equipment 132 is also configured to allow output of information from WD 110, and to allow processing circuitry 120 to output information from WD 110. User interface equipment 132 may include, for example, a speaker, a display, vibrating circuitry, a USB port, a headphone interface, or other output circuitry. Using one or more input and output interfaces, devices, and circuits, of user interface equipment 132, WD 110 may communicate with end users and/or the wireless network and allow them to benefit from the functionality described herein.

Auxiliary equipment 134 is operable to provide more specific functionality which may not be generally performed by WDs. This may comprise specialized sensors for doing measurements for various purposes, interfaces for additional types of communication such as wired communications etc. The inclusion and type of components of auxiliary equipment 134 may vary depending on the embodiment and/or scenario.

Power source 136 may, in some embodiments, be in the form of a battery or battery pack. Other types of power sources, such as an external power source (e.g., an electricity outlet), photovoltaic devices or power cells, may also be used. WD 110 may further comprise power circuitry 137 for delivering power from power source 136 to the various parts of WD 110 which need power from power source 136 to carry out any functionality described or indicated herein. Power circuitry 137 may in certain embodiments comprise power management circuitry.

Power circuitry 137 may additionally or alternatively be operable to receive power from an external power source; in which case WD 110 may be connectable to the external power source (such as an electricity outlet) via input circuitry or an interface such as an electrical power cable. Power circuitry 137 may also in certain embodiments be operable to deliver power from an external power source to power source 136. This may be, for example, for the charging of power source 136. Power circuitry 137 may perform any formatting, converting, or other modification to the power from power source 136 to make the power suitable for the respective components of WD 110 to which power is supplied.

Although the subject matter described herein may be implemented in any appropriate type of system using any suitable components, the embodiments disclosed herein are described in relation to a wireless network, such as the example wireless network illustrated in FIG. 1. For simplicity, the wireless network of FIG. 1 only depicts network 106, network nodes 160 and 160b, and WDs 110, 110b, and 110c. In practice, a wireless network may further include any additional elements suitable to support communication between wireless devices or between a wireless device and another communication device, such as a landline telephone, a service provider, or any other network node or end device. Of the illustrated components, network node 160 and wireless device (WD) 110 are depicted with additional detail. The wireless network may provide communication and other types of services to one or more wireless devices to facilitate the wireless devices' access to and/or use of the services provided by, or via, the wireless network.

Figure 2:
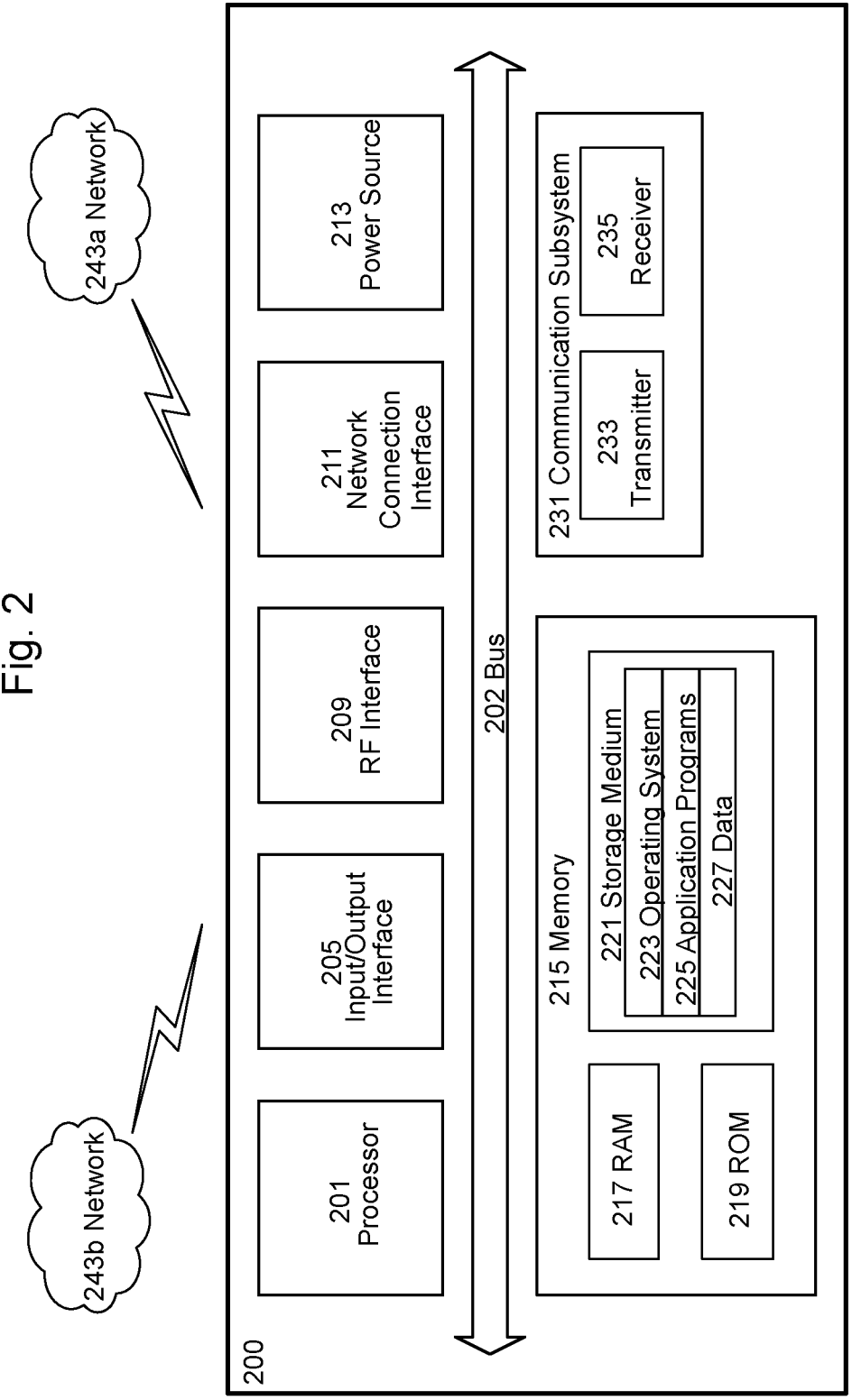
FIG. 2 illustrates an example user equipment, according to certain embodiments.

FIG. 2 illustrates an example user equipment, according to certain embodiments. As used herein, a user equipment or UE may not necessarily have a user in the sense of a human user who owns and/or operates the relevant device. Instead, a UE may represent a device that is intended for sale to, or operation by, a human user but which may not, or which may not initially, be associated with a specific human user (e.g., a smart sprinkler controller). Alternatively, a UE may represent a device that is not intended for sale to, or operation by, an end user but which may be associated with or operated for the benefit of a user (e.g., a smart power meter). UE 200 may be any UE identified by the 3$^{rd}$ Generation Partnership Project (3GPP), including a NB-IoT UE, a machine type communication (MTC) UE, and/or an enhanced MTC (eMTC) UE. UE 200, as illustrated in FIG. 2, is one example of a WD configured for communication in accordance with one or more communication standards promulgated by the 3$^{rd}$ Generation Partnership Project (3GPP), such as 3GPP's GSM, UMTS, LTE, and/or 5G standards. As mentioned previously, the term WD and UE may be used interchangeable. Accordingly, although FIG. 2 is a UE, the components discussed herein are equally applicable to a WD, and vice-versa.

In FIG. 2, UE 200 includes processing circuitry 201 that is operatively coupled to input/output interface 205, radio frequency (RF) interface 209, network connection interface 211, memory 215 including random access memory (RAM) 217, read-only memory (ROM) 219, and storage medium 221 or the like, communication subsystem 231, power source 233, and/or any other component, or any combination thereof. Storage medium 221 includes operating system 223, application program 225, and data 227. In other embodiments, storage medium 221 may include other similar types of information. Certain UEs may use all the components shown in FIG. 2, or only a subset of the components. The level of integration between the components may vary from one UE to another UE. Further, certain UEs may contain multiple instances of a component, such as multiple processors, memories, transceivers, transmitters, receivers, etc.

In FIG. 2, processing circuitry 201 may be configured to process computer instructions and data. Processing circuitry 201 may be configured to implement any sequential state machine operative to execute machine instructions stored as machine-readable computer programs in the memory, such as one or more hardware-implemented state machines (e.g., in discrete logic, FPGA, ASIC, etc.); programmable logic together with appropriate firmware; one or more stored program, general-purpose processors, such as a microprocessor or Digital Signal Processor (DSP), together with appropriate software; or any combination of the above. For example, the processing circuitry 201 may include two central processing units (CPUs). Data may be information in a form suitable for use by a computer.

In the depicted embodiment, input/output interface 205 may be configured to provide a communication interface to an input device, output device, or input and output device. UE 200 may be configured to use an output device via input/output interface 205.

An output device may use the same type of interface port as an input device. For example, a USB port may be used to provide input to and output from UE 200. The output device may be a speaker, a sound card, a video card, a display, a monitor, a printer, an actuator, an emitter, a smartcard, another output device, or any combination thereof.

UE 200 may be configured to use an input device via input/output interface 205 to allow a user to capture information into UE 200. The input device may include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display may include a capacitive or resistive touch sensor to sense input from a user. A sensor may be, for instance, an accelerometer, a gyroscope, a tilt sensor, a force sensor, a magnetometer, an optical sensor, a proximity sensor, another like sensor, or any combination thereof. For example, the input device may be an accelerometer, a magnetometer, a digital camera, a microphone, and an optical sensor.

In FIG. 2, RF interface 209 may be configured to provide a communication interface to RF components such as a transmitter, a receiver, and an antenna. Network connection interface 211 may be configured to provide a communication interface to network 243*a*. Network 243*a* may encompass wired and/or wireless networks such as a local-area network (LAN), a wide-area network (WAN), a computer network, a wireless network, a telecommunications network, another like network or any combination thereof. For example, network 243*a* may comprise a Wi-Fi network. Network connection interface 211 may be configured to include a receiver and a transmitter interface used to communicate with one or more other devices over a communication network according to one or more communication protocols, such as Ethernet, TCP/IP, SONET, ATM, or the like. Network connection interface 211 may implement receiver and transmitter functionality appropriate to the communication network links (e.g., optical, electrical, and the like). The transmitter and receiver functions may share circuit components, software or firmware, or alternatively may be implemented separately.

RAM 217 may be configured to interface via bus 202 to processing circuitry 201 to provide storage or caching of data or computer instructions during the execution of software programs such as the operating system, application programs, and device drivers. ROM 219 may be configured to provide computer instructions or data to processing circuitry 201. For example, ROM 219 may be configured to store invariant low-level system code or data for basic system functions such as basic input and output (I/O), startup, or reception of keystrokes from a keyboard that are stored in a non-volatile memory.

Storage medium 221 may be configured to include memory such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, or flash drives. In one example, storage medium 221 may be configured to include operating system 223, application program 225 such as a web browser application, a widget or gadget engine or another application, and data file 227. Storage medium 221 may store, for use by UE 200, any of a variety of various operating systems or combinations of operating systems.

Storage medium 221 may be configured to include a number of physical drive units, such as redundant array of independent disks (RAID), floppy disk drive, flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as a subscriber identity module or a removable user identity (SIM/RUIM) module, other memory, or any combination thereof. Storage medium 221 may allow UE 200 to access computer-executable instructions, application programs or the like, stored on transitory or non-transitory memory media, to off-load data, or to upload data. An article of manufacture, such as one utilizing a communication system may be tangibly embodied in storage medium 221, which may comprise a device readable medium.

In FIG. 2, processing circuitry 201 may be configured to communicate with network 243b using communication subsystem 231. Network 243a and network 243b may be the same network or networks or different network or networks. Communication subsystem 231 may be configured to include one or more transceivers used to communicate with network 243b. For example, communication subsystem 231 may be configured to include one or more transceivers used to communicate with one or more remote transceivers of another device capable of wireless communication such as another WD, UE, or base station of a radio access network (RAN) according to one or more communication protocols, such as IEEE 802.2, CDMA, WCDMA, GSM, LTE, UTRAN, WiMax, or the like. Each transceiver may include transmitter 233 and/or receiver 235 to implement transmitter or receiver functionality, respectively, appropriate to the RAN links (e.g., frequency allocations and the like). Further, transmitter 233 and receiver 235 of each transceiver may share circuit components, software or firmware, or alternatively may be implemented separately.

In the illustrated embodiment, the communication functions of communication subsystem 231 may include data communication, voice communication, multimedia communication, short-range communications such as Bluetooth, near-field communication, location-based communication such as the use of the global positioning system (GPS) to determine a location, another like communication function, or any combination thereof. For example, communication subsystem 231 may include cellular communication, Wi-Fi communication, Bluetooth communication, and GPS communication. Network 243b may encompass wired and/or wireless networks such as a local-area network (LAN), a wide-area network (WAN), a computer network, a wireless network, a telecommunications network, another like network or any combination thereof. For example, network 243b may be a cellular network, a Wi-Fi network, and/or a near-field network. Power source 213 may be configured to provide alternating current (AC) or direct current (DC) power to components of UE 200.

The features, benefits and/or functions described herein may be implemented in one of the components of UE 200 or partitioned across multiple components of UE 200. Further, the features, benefits, and/or functions described herein may be implemented in any combination of hardware, software or firmware. In one example, communication subsystem 231 may be configured to include any of the components described herein. Further, processing circuitry 201 may be configured to communicate with any of such components over bus 202. In another example, any of such components may be represented by program instructions stored in memory that when executed by processing circuitry 201 perform the corresponding functions described herein. In another example, the functionality of any of such components may be partitioned between processing circuitry 201 and communication subsystem 231. In another example, the non-computationally intensive functions of any of such components may be implemented in software or firmware and the computationally intensive functions may be implemented in hardware.

Figure 3:
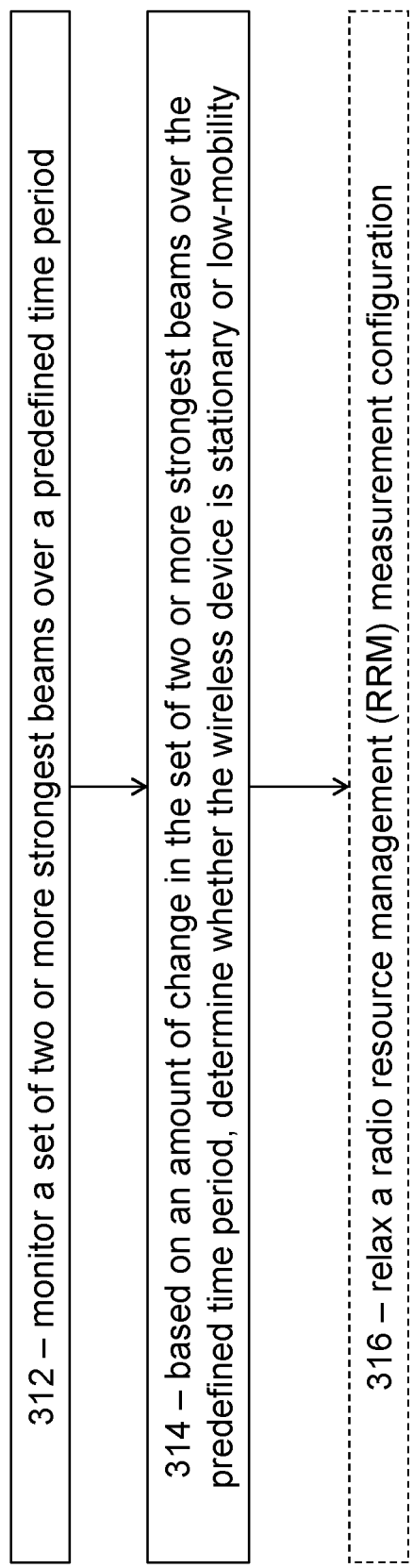
FIG. 3 is flowchart illustrating an example method in a wireless device, according to certain embodiments.

FIG. 3 is a flowchart illustrating an example method in a wireless device, according to certain embodiments. In particular embodiments, one or more steps of FIG. 3 may be performed by wireless device 110 described with respect to FIG. 1.

The method begins at step 312, where the wireless device (e.g., wireless device 110) monitors a set of two or more strongest beams over a predefined time period. For example, the wireless device may monitor beams according to any of the embodiments and examples (e.g., $Beams_n$ and $Beams_m$) described above.

At step 314, based on an amount of change in the set of two or more strongest beams over the predefined time period, the wireless device determines whether the wireless device is stationary or low-mobility.

In particular embodiments, the change in the set of two or more strongest beams refers to a change in the strongest beams over the predetermined time period, a change in the ordering of the strongest beams over the predetermined time period, a change in the signal strength of the strongest beams over the predetermined time period, or a change in antenna panels used by the wireless device over the predetermined time period.

At step 316, upon determining the wireless device is stationary or low-mobility, the wireless device may relax a RRM measurement configuration. For example, for stationary or low-mobility wireless devices, the wireless device may reduce the number of measurements, reduce a periodicity of measurements, reduce a number of beams or cells to measure, etc.

Modifications, additions, or omissions may be made to method 300 of FIG. 3. Additionally, one or more steps in the method of FIG. 3 may be performed in parallel or in any suitable order.

Figure 4:
FIG. 4 is a flowchart illustrating another example method in a wireless device, according to certain embodiments.

FIG. 4 is a flowchart illustrating another example method in a wireless device, according to certain embodiments. In particular embodiments, one or more steps of FIG. 4 may be performed by wireless device 110 described with respect to FIG. 1.

The method begins at step 412, where the wireless device (e.g., wireless device 110 monitors a set of two or more strongest neighbor cells over a predefined time period. For example, the wireless device may monitor neighbor cells according to any of the embodiments and examples described above.

At step 414, based on an amount of change in the set of two or more strongest neighbor cells over the predefined time period, the wireless device determines whether the wireless device is stationary or low-mobility.

In particular embodiments, the change in the set of two or more strongest neighbor cells refers to a change in the strongest neighbor cells over the predetermined time period, a change in the ordering of the strongest neighbor cells over the predetermined time period, a change in the signal strength of the strongest neighbor cells over the predetermined time period, or a change in antenna panels used by the wireless device over the predetermined time period.

At step 416, upon determining the wireless device is stationary or low-mobility, the wireless device may relax a RRM measurement configuration. For example, for stationary or low-mobility wireless devices, the wireless device may reduce the number of measurements, reduce a periodicity of measurements, reduce a number of beams or cells to measure, etc.

Modifications, additions, or omissions may be made to method 400 of FIG. 4. Additionally, one or more steps in the method of FIG. 4 may be performed in parallel or in any suitable order. In some embodiments, steps of methods 300 and 400 may be combined.

Figure 5:
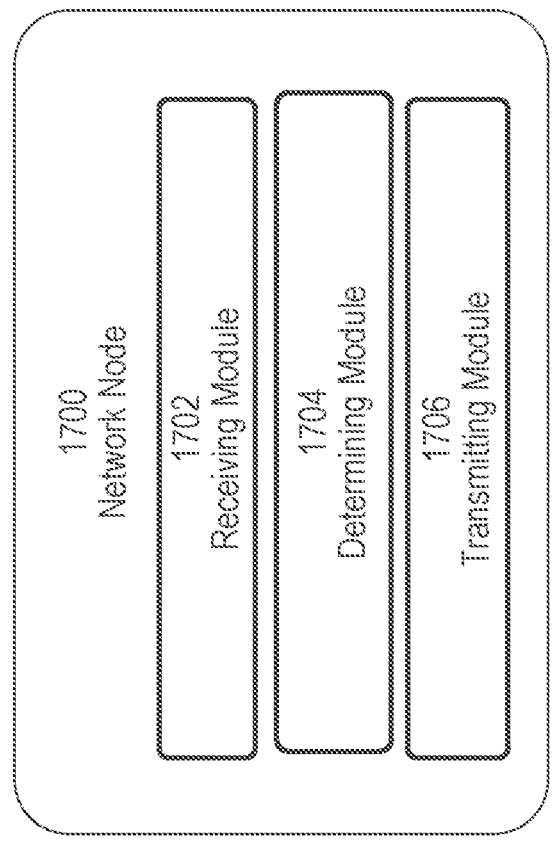
FIG. 5 illustrates a schematic block diagram of a wireless device and network node in a wireless network, according to certain embodiments.
Figure 5:
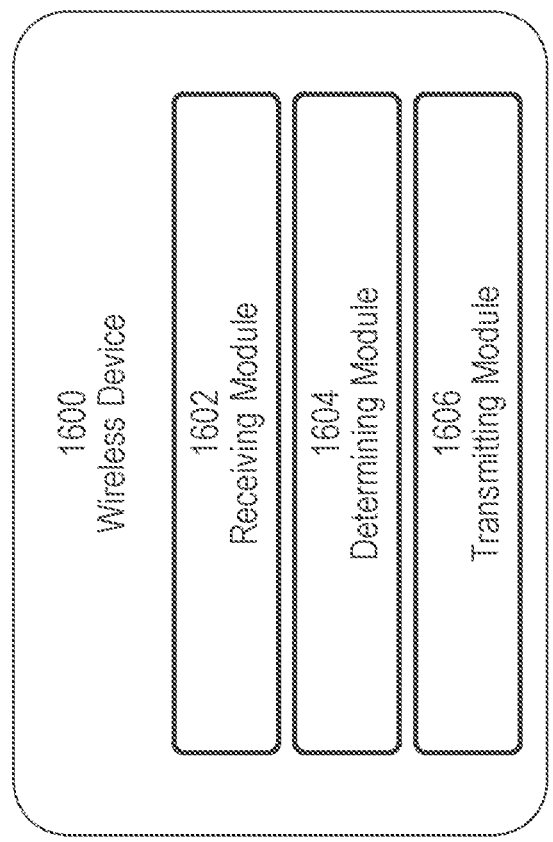

FIG. 5 illustrates a schematic block diagram of two apparatuses in a wireless network (for example, the wireless network illustrated in FIG. 1). The apparatuses include a wireless device and a network node (e.g., wireless device 110 and network node 160 illustrated in FIG. 1). Apparatus 1600 is operable to carry out the example methods described with reference to FIGS. 3 and 4. Apparatuses 1600 and 1700 may be operable to carry out other processes or methods disclosed herein. It is also to be understood that the methods of FIGS. 3 and 4 are not necessarily carried out solely by apparatus 1600. At least some operations of the methods can be performed by one or more other entities.

Virtual apparatuses 1600 and 1700 may comprise processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory, cache memory, flash memory devices, optical storage devices, etc. Program code stored in memory includes program instructions for executing one or more telecommunications and/or data communications protocols as well as instructions for carrying out one or more of the techniques described herein, in several embodiments.

As illustrated in FIG. 5, apparatus 1600 includes receiving module 1602 configured to receive measurement configurations and reference signals associated with particular beams, based on any of the embodiments and examples described herein. Determining module 1604 is configured to determine whether a wireless device is stationary or low-mobility, according to any of the embodiments and examples described herein. Transmitting module 1606 is configured to transmit configuration information, confirmations, and other indications, based on any of the embodiments and examples described herein.

As illustrated in FIG. 5, apparatus 1700 includes receiving module 1702 configured to receiving configuration information, confirmations, and other indications, based on any of the embodiments and examples described herein. Determining module 1704 is configured to determine whether to perform a mobility procedure for a wireless device, according to any of the embodiments and examples described herein. Transmitting module 1706 is configured to transmit configuration information, confirmations, and other indications, based on any of the embodiments and examples described herein.

Figure 6:
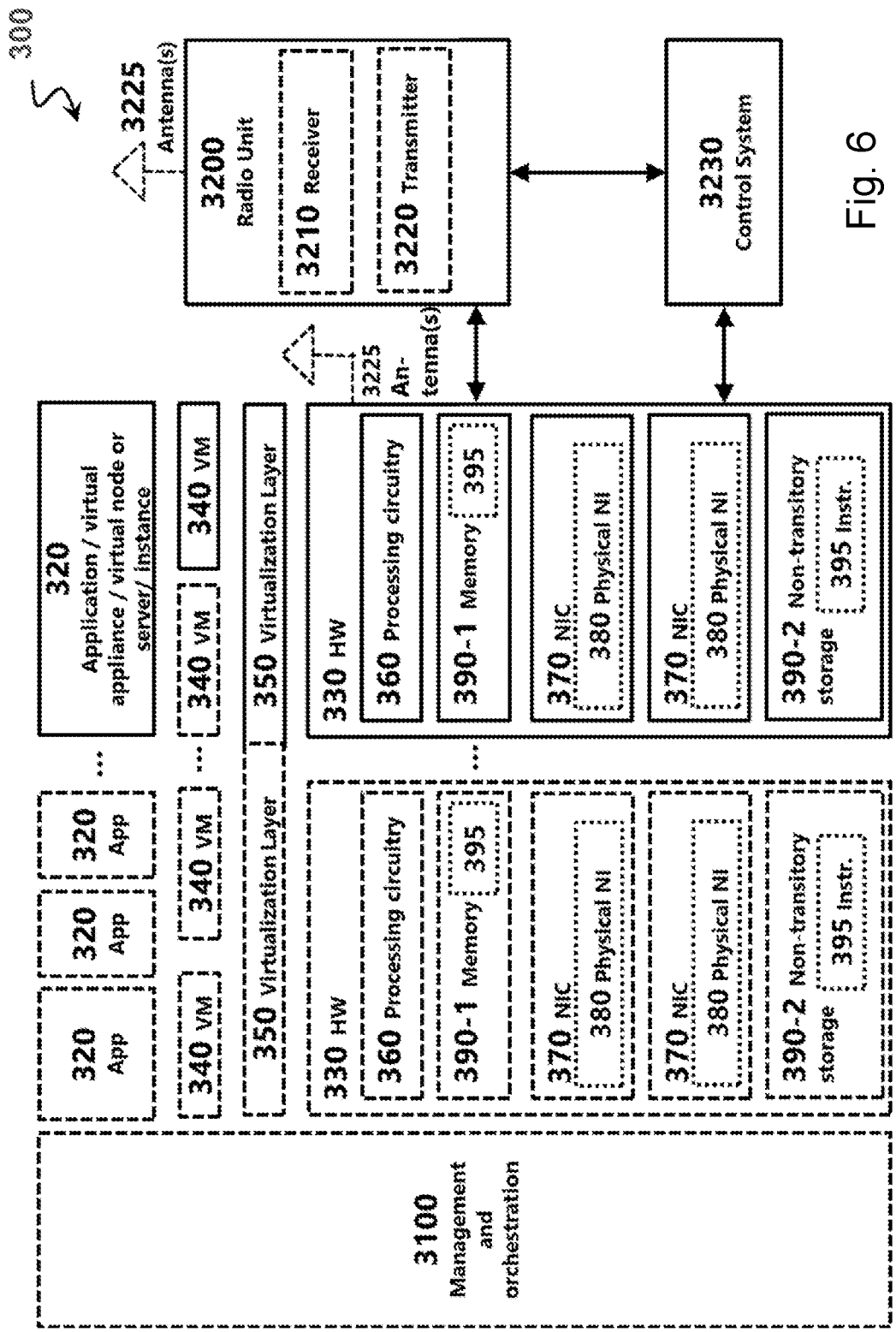
FIG. 6 illustrates an example virtualization environment, according to certain embodiments.

FIG. 6 is a schematic block diagram illustrating a virtualization environment 300 in which functions implemented by some embodiments may be virtualized. In the present context, virtualizing means creating virtual versions of apparatuses or devices which may include virtualizing hardware platforms, storage devices and networking resources. As used herein, virtualization can be applied to a node (e.g., a virtualized base station or a virtualized radio access node) or to a device (e.g., a UE, a wireless device or any other type of communication device) or components thereof and relates to an implementation in which at least a portion of the functionality is implemented as one or more virtual components (e.g., via one or more applications, components, functions, virtual machines or containers executing on one or more physical processing nodes in one or more networks).

In some embodiments, some or all of the functions described herein may be implemented as virtual components executed by one or more virtual machines implemented in one or more virtual environments 300 hosted by one or more of hardware nodes 330. Further, in embodiments in which the virtual node is not a radio access node or does not require radio connectivity (e.g., a core network node), then the network node may be entirely virtualized.

The functions may be implemented by one or more applications 320 (which may alternatively be called software instances, virtual appliances, network functions, virtual nodes, virtual network functions, etc.) operative to implement some of the features, functions, and/or benefits of some of the embodiments disclosed herein. Applications 320 are run in virtualization environment 300 which provides hardware 330 comprising processing circuitry 360 and memory 390. Memory 390 contains instructions 395 executable by processing circuitry 360 whereby application 320 is operative to provide one or more of the features, benefits, and/or functions disclosed herein.

Virtualization environment 300, comprises general-purpose or special-purpose network hardware devices 330 comprising a set of one or more processors or processing circuitry 360, which may be commercial off-the-shelf (COTS) processors, dedicated Application Specific Integrated Circuits (ASICs), or any other type of processing circuitry including digital or analog hardware components or special purpose processors. Each hardware device may comprise memory 390-1 which may be non-persistent memory for temporarily storing instructions 395 or software executed by processing circuitry 360. Each hardware device may comprise one or more network interface controllers (NICs) 370, also known as network interface cards, which include physical network interface 380. Each hardware device may also include non-transitory, persistent, machine-readable storage media 390-2 having stored therein software 395 and/or instructions executable by processing circuitry 360. Software 395 may include any type of software including software for instantiating one or more virtualization layers 350 (also referred to as hypervisors), software to execute virtual machines 340 as well as software allowing it to execute functions, features and/or benefits described in relation with some embodiments described herein.

Virtual machines 340, comprise virtual processing, virtual memory, virtual networking or interface and virtual storage, and may be run by a corresponding virtualization layer 350 or hypervisor. Different embodiments of the instance of virtual appliance 320 may be implemented on one or more of virtual machines 340, and the implementations may be made in different ways.

During operation, processing circuitry 360 executes software 395 to instantiate the hypervisor or virtualization layer 350, which may sometimes be referred to as a virtual machine monitor (VMM). Virtualization layer 350 may present a virtual operating platform that appears like networking hardware to virtual machine 340.

As shown in FIG. 6, hardware 330 may be a standalone network node with generic or specific components. Hardware 330 may comprise antenna 3225 and may implement some functions via virtualization. Alternatively, hardware 330 may be part of a larger cluster of hardware (e.g. such as in a data center or customer premise equipment (CPE)) where many hardware nodes work together and are managed via management and orchestration (MANO) 3100, which, among others, oversees lifecycle management of applications 320.

Virtualization of the hardware is in some contexts referred to as network function virtualization (NFV). NFV may be used to consolidate many network equipment types onto industry standard high-volume server hardware, physical switches, and physical storage, which can be located in data centers, and customer premise equipment.

In the context of NFV, virtual machine 340 may be a software implementation of a physical machine that runs programs as if they were executing on a physical, non-virtualized machine. Each of virtual machines 340, and that part of hardware 330 that executes that virtual machine, be it hardware dedicated to that virtual machine and/or hardware shared by that virtual machine with others of the virtual machines 340, forms a separate virtual network elements (VNE).

Still in the context of NFV, Virtual Network Function (VNF) is responsible for handling specific network functions that run in one or more virtual machines 340 on top of hardware networking infrastructure 330 and corresponds to application 320 in FIG. 18.

In some embodiments, one or more radio units 3200 that each include one or more transmitters 3220 and one or more receivers 3210 may be coupled to one or more antennas 3225. Radio units 3200 may communicate directly with hardware nodes 330 via one or more appropriate network interfaces and may be used in combination with the virtual components to provide a virtual node with radio capabilities, such as a radio access node or a base station.

In some embodiments, some signaling can be effected with the use of control system 3230 which may alternatively be used for communication between the hardware nodes 330 and radio units 3200.

Figure 7:
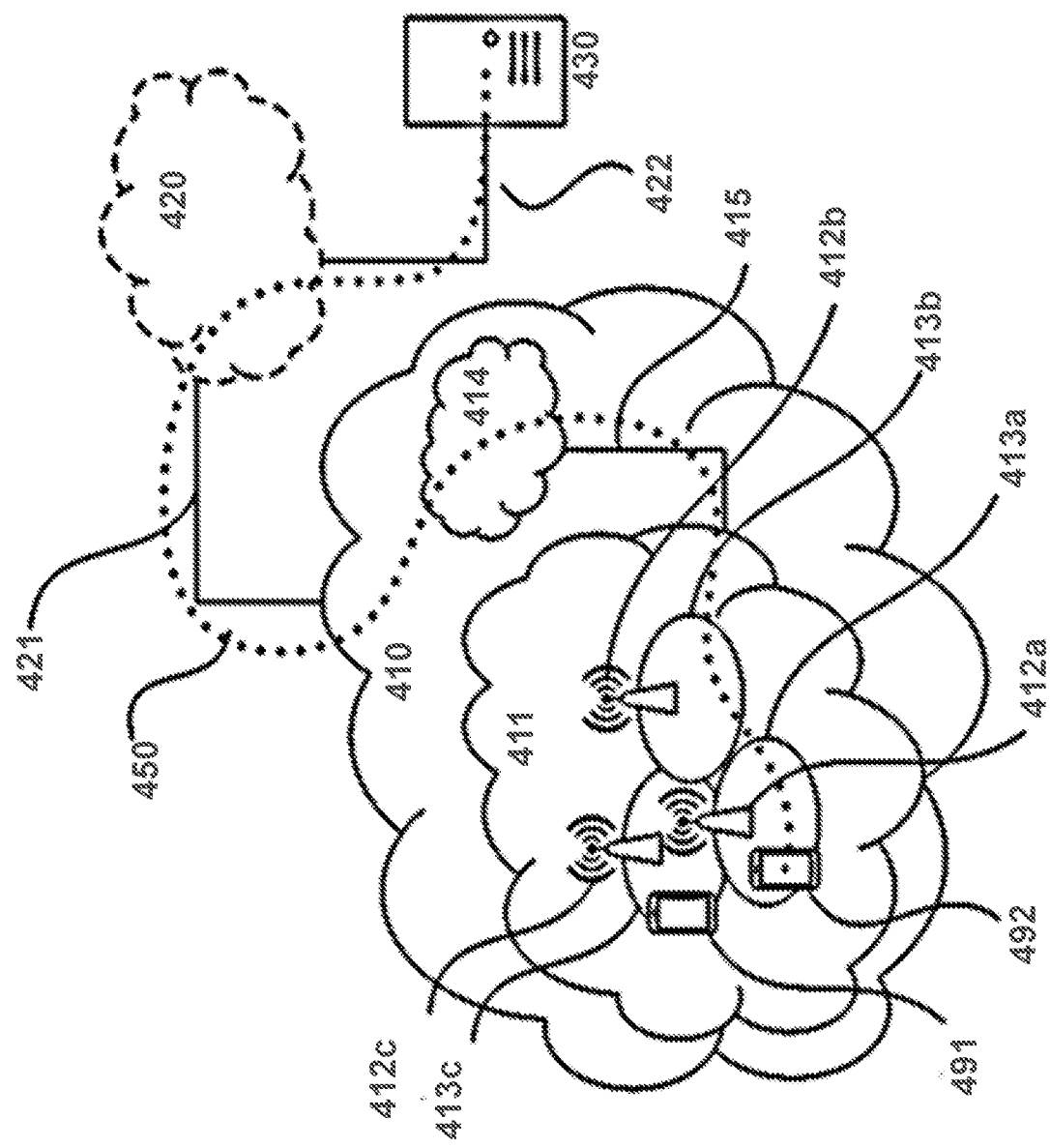
FIG. 7 illustrates an example telecommunication network connected via an intermediate network to a host computer, according to certain embodiments.

With reference to FIG. 7, in accordance with an embodiment, a communication system includes telecommunication network 410, such as a 3GPP-type cellular network, which comprises access network 411, such as a radio access network, and core network 414. Access network 411 comprises a plurality of base stations 412a, 412b, 412c, such as NBs, eNBs, gNBs or other types of wireless access points, each defining a corresponding coverage area 413a, 413b, 413c. Each base station 412a, 412b, 412c is connectable to core network 414 over a wired or wireless connection 415. A first UE 491 located in coverage area 413c is configured to wirelessly connect to, or be paged by, the corresponding base station 412c. A second UE 492 in coverage area 413a is wirelessly connectable to the corresponding base station 412a. While a plurality of UEs 491, 492 are illustrated in this example, the disclosed embodiments are equally applicable to a situation where a sole UE is in the coverage area or where a sole UE is connecting to the corresponding base station 412.

Telecommunication network 410 is itself connected to host computer 430, which may be embodied in the hardware and/or software of a standalone server, a cloud-implemented server, a distributed server or as processing resources in a server farm. Host computer 430 may be under the ownership or control of a service provider or may be operated by the service provider or on behalf of the service provider. Connections 421 and 422 between telecommunication network 410 and host computer 430 may extend directly from core network 414 to host computer 430 or may go via an optional intermediate network 420. Intermediate network 420 may be one of, or a combination of more than one of, a public, private or hosted network; intermediate network 420, if any, may be a backbone network or the Internet; in particular, intermediate network 420 may comprise two or more subnetworks (not shown).

The communication system of FIG. 7 as a whole enables connectivity between the connected UEs 491, 492 and host computer 430. The connectivity may be described as an over-the-top (OTT) connection 450. Host computer 430 and the connected UEs 491, 492 are configured to communicate data and/or signaling via OTT connection 450, using access network 411, core network 414, any intermediate network 420 and possible further infrastructure (not shown) as intermediaries. OTT connection 450 may be transparent in the sense that the participating communication devices through which OTT connection 450 passes are unaware of routing of uplink and downlink communications. For example, base station 412 may not or need not be informed about the past routing of an incoming downlink communication with data originating from host computer 430 to be forwarded (e.g., handed over) to a connected UE 491. Similarly, base station 412 need not be aware of the future routing of an outgoing uplink communication originating from the UE 491 towards the host computer 430.

Figure 8:
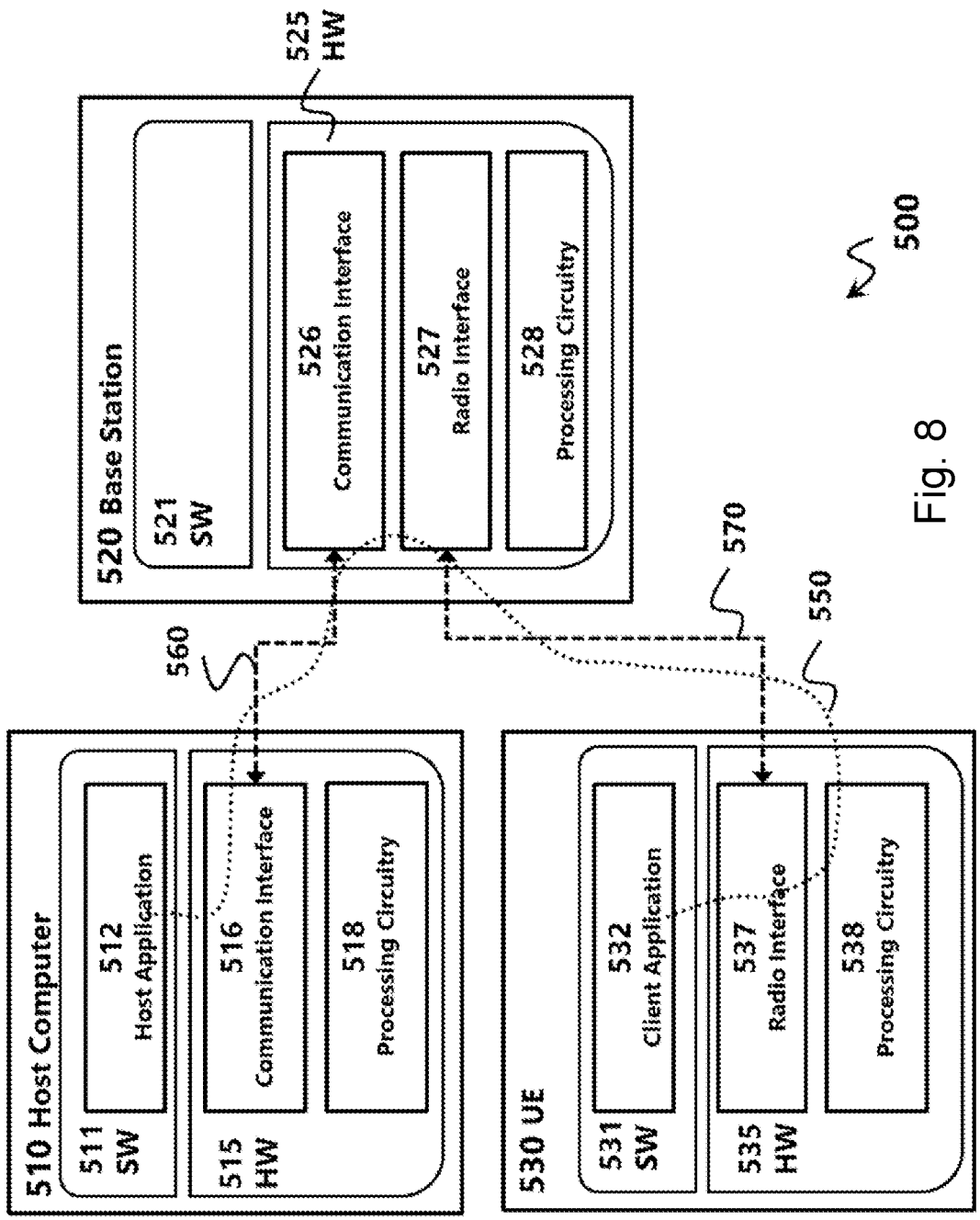
FIG. 8 illustrates an example host computer communicating via a base station with a user equipment over a partially wireless connection, according to certain embodiments.

FIG. 8 illustrates an example host computer communicating via a base station with a user equipment over a partially wireless connection, according to certain embodiments. Example implementations, in accordance with an embodiment of the UE, base station and host computer discussed in the preceding paragraphs will now be described with reference to FIG. 8. In communication system 500, host computer 510 comprises hardware 515 including communication interface 516 configured to set up and maintain a wired or wireless connection with an interface of a different communication device of communication system 500. Host computer 510 further comprises processing circuitry 518, which may have storage and/or processing capabilities. In particular, processing circuitry 518 may comprise one or more programmable processors, application-specific integrated circuits, field programmable gate arrays or combinations of these (not shown) adapted to execute instructions. Host computer 510 further comprises software 511, which is stored in or accessible by host computer 510 and executable by processing circuitry 518. Software 511 includes host application 512. Host application 512 may be operable to provide a service to a remote user, such as UE 530 connecting via OTT connection 550 terminating at UE 530 and host computer 510. In providing the service to the remote user, host application 512 may provide user data which is transmitted using OTT connection 550.

Communication system 500 further includes base station 520 provided in a telecommunication system and comprising hardware 525 enabling it to communicate with host computer 510 and with UE 530. Hardware 525 may include communication interface 526 for setting up and maintaining a wired or wireless connection with an interface of a different communication device of communication system 500, as well as radio interface 527 for setting up and maintaining at least wireless connection 570 with UE 530 located in a coverage area (not shown in FIG. 8) served by base station 520. Communication interface 526 may be configured to facilitate connection 560 to host computer 510. Connection 560 may be direct, or it may pass through a core network (not shown in FIG. 8) of the telecommunication system and/or through one or more intermediate networks outside the telecommunication system. In the embodiment shown, hardware 525 of base station 520 further includes processing circuitry 528, which may comprise one or more programmable processors, application-specific integrated circuits, field programmable gate arrays or combinations of these (not shown) adapted to execute instructions. Base station 520 further has software 521 stored internally or accessible via an external connection.

Communication system 500 further includes UE 530 already referred to. Its hardware 535 may include radio interface 537 configured to set up and maintain wireless connection 570 with a base station serving a coverage area in which UE 530 is currently located. Hardware 535 of UE 530 further includes processing circuitry 538, which may comprise one or more programmable processors, application-specific integrated circuits, field programmable gate arrays or combinations of these (not shown) adapted to execute instructions. UE 530 further comprises software 531, which is stored in or accessible by UE 530 and executable by processing circuitry 538. Software 531 includes client application 532. Client application 532 may be operable to provide a service to a human or non-human user via UE 530, with the support of host computer 510. In host computer 510, an executing host application 512 may communicate with the executing client application 532 via OTT connection 550 terminating at UE 530 and host computer 510. In providing the service to the user, client application 532 may receive request data from host application 512 and provide user data in response to the request data. OTT connection 550 may transfer both the request data and the user data. Client application 532 may interact with the user to generate the user data that it provides.

It is noted that host computer 510, base station 520 and UE 530 illustrated in FIG. 8 may be similar or identical to host computer 430, one of base stations 412a, 412b, 412c and one of UEs 491, 492 of FIG. 1, respectively. This is to say, the inner workings of these entities may be as shown in FIG. 8 and independently, the surrounding network topology may be that of FIG. 1.

In FIG. 8, OTT connection 550 has been drawn abstractly to illustrate the communication between host computer 510 and UE 530 via base station 520, without explicit reference to any intermediary devices and the precise routing of messages via these devices. Network infrastructure may determine the routing, which it may be configured to hide from UE 530 or from the service provider operating host computer 510, or both. While OTT connection 550 is active, the network infrastructure may further take decisions by which it dynamically changes the routing (e.g., based on load balancing consideration or reconfiguration of the network).

Wireless connection 570 between UE 530 and base station 520 is in accordance with the teachings of the embodiments described throughout this disclosure. One or more of the various embodiments improve the performance of OTT services provided to UE 530 using OTT connection 550, in which wireless connection 570 forms the last segment.

A measurement procedure may be provided for monitoring data rate, latency and other factors on which the one or more embodiments improve. There may further be an optional network functionality for reconfiguring OTT connection 550 between host computer 510 and UE 530, in response to variations in the measurement results. The measurement procedure and/or the network functionality for reconfiguring OTT connection 550 may be implemented in software 511 and hardware 515 of host computer 510 or in software 531 and hardware 535 of UE 530, or both. In embodiments, sensors (not shown) may be deployed in or in association with communication devices through which OTT connection 550 passes; the sensors may participate in the measurement procedure by supplying values of the monitored quantities exemplified above or supplying values of other physical quantities from which software 511, 531 may compute or estimate the monitored quantities. The reconfiguring of OTT connection 550 may include message format, retransmission settings, preferred routing etc.; the reconfiguring need not affect base station 520, and it may be unknown or imperceptible to base station 520. Such procedures and functionalities may be known and practiced in the art. In certain embodiments, measurements may involve proprietary UE signaling facilitating host computer 510's measurements of throughput, propagation times, latency and the like. The measurements may be implemented in that software 511 and 531 causes messages to be transmitted, in particular empty or 'dummy' messages, using OTT connection 550 while it monitors propagation times, errors etc.

Figure 9:
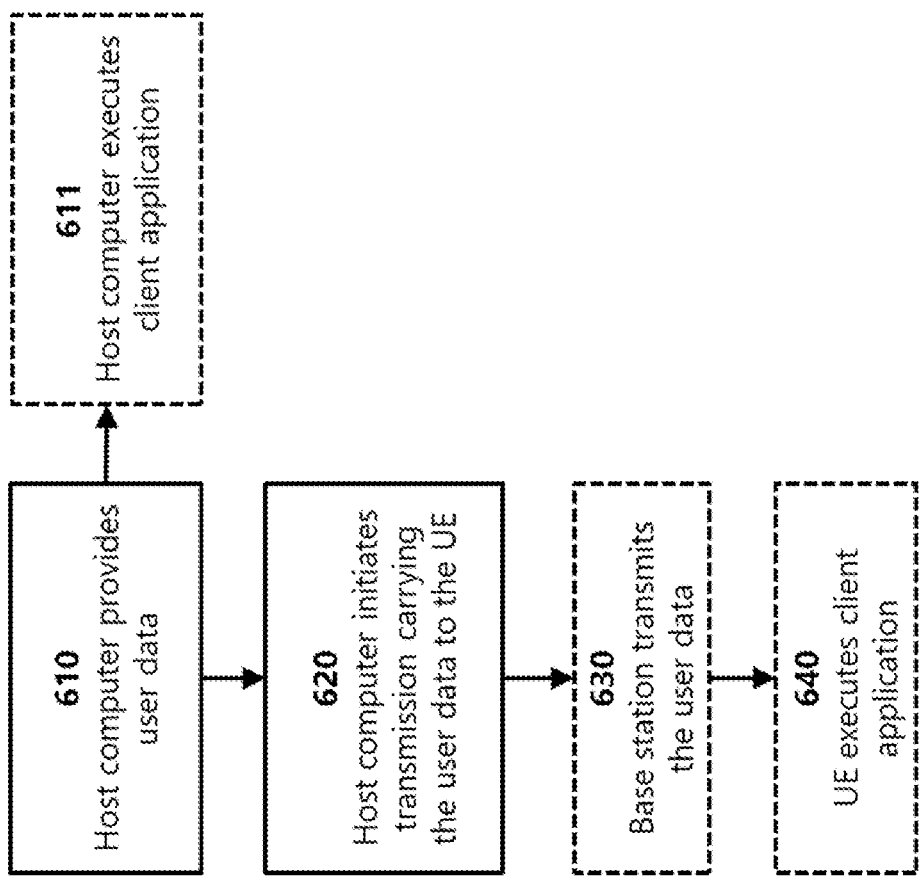
FIG. 9 is a flowchart illustrating a method implemented, according to certain embodiments.

FIG. 9 is a flowchart illustrating a method implemented in a communication system, in accordance with one embodiment. The communication system includes a host computer, a base station and a UE which may be those described with reference to FIGS. 7 and 8. For simplicity of the present disclosure, only drawing references to FIG. 9 will be included in this section.

In step 610, the host computer provides user data. In substep 611 (which may be optional) of step 610, the host computer provides the user data by executing a host application. In step 620, the host computer initiates a transmission carrying the user data to the UE. In step 630 (which may be optional), the base station transmits to the UE the user data which was carried in the transmission that the host computer initiated, in accordance with the teachings of the embodiments described throughout this disclosure. In step 640 (which may also be optional), the UE executes a client application associated with the host application executed by the host computer.

Figure 10:
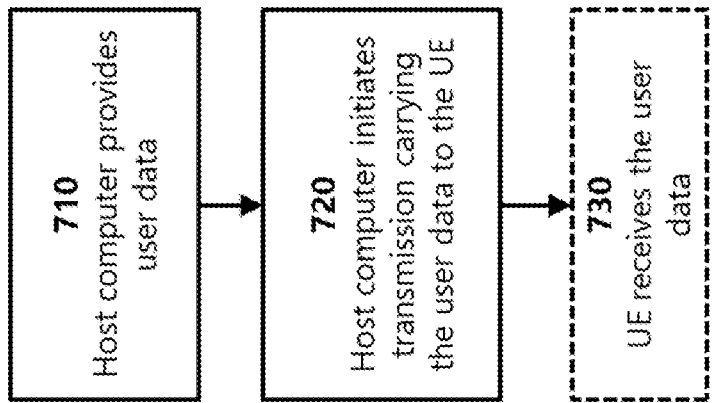
FIG. 10 is a flowchart illustrating a method implemented in a communication system, according to certain embodiments.

FIG. 10 is a flowchart illustrating a method implemented in a communication system, in accordance with one embodiment. The communication system includes a host computer, a base station and a UE which may be those described with reference to FIGS. 7 and 8. For simplicity of the present disclosure, only drawing references to FIG. 10 will be included in this section.

In step 710 of the method, the host computer provides user data. In an optional substep (not shown) the host computer provides the user data by executing a host application. In step 720, the host computer initiates a transmission carrying the user data to the UE. The transmission may pass via the base station, in accordance with the teachings of the embodiments described throughout this disclosure. In step 730 (which may be optional), the UE receives the user data carried in the transmission.

Figure 11:
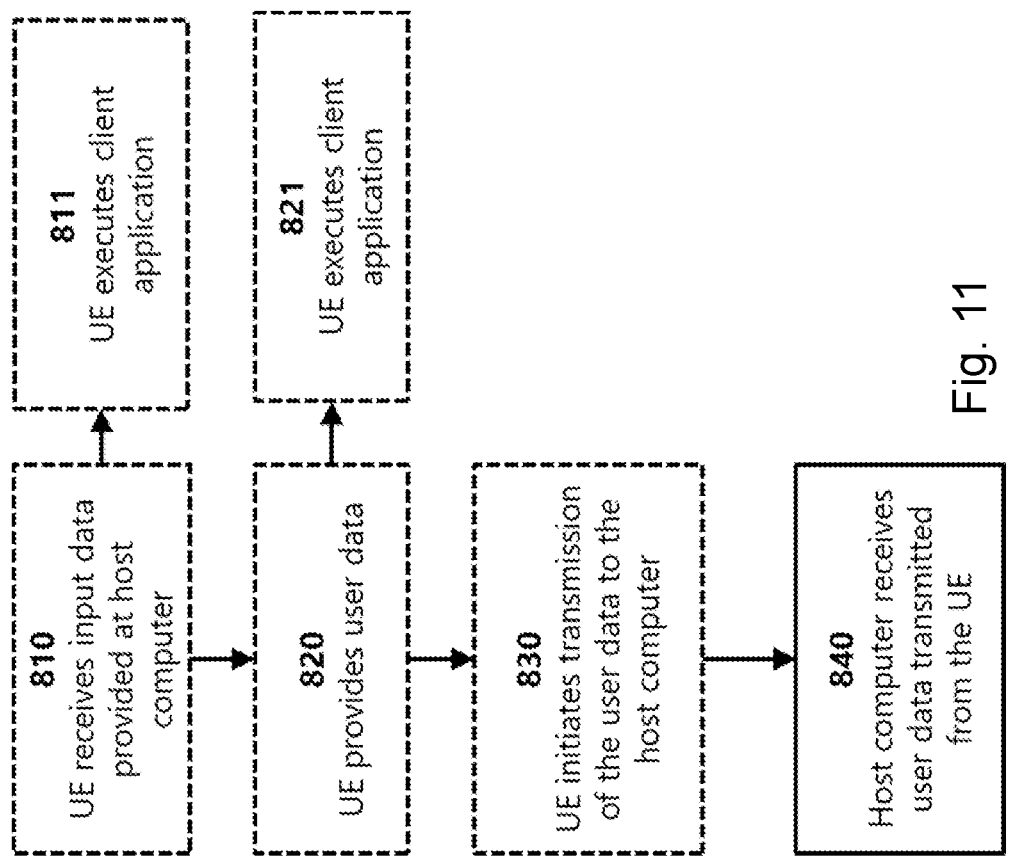
FIG. 11 is a flowchart illustrating a method implemented in a communication system, according to certain embodiments.

FIG. 11 is a flowchart illustrating a method implemented in a communication system, in accordance with one embodiment. The communication system includes a host computer, a base station and a UE which may be those described with reference to FIGS. 7 and 8. For simplicity of the present disclosure, only drawing references to FIG. 11 will be included in this section.

In step 810 (which may be optional), the UE receives input data provided by the host computer. Additionally, or alternatively, in step 820, the UE provides user data. In substep 821 (which may be optional) of step 820, the UE provides the user data by executing a client application. In substep 811 (which may be optional) of step 810, the UE executes a client application which provides the user data in reaction to the received input data provided by the host computer. In providing the user data, the executed client application may further consider user input received from the user. Regardless of the specific manner in which the user data was provided, the UE initiates, in substep 830 (which may be optional), transmission of the user data to the host computer. In step 840 of the method, the host computer receives the user data transmitted from the UE, in accordance with the teachings of the embodiments described throughout this disclosure.

Figure 12:
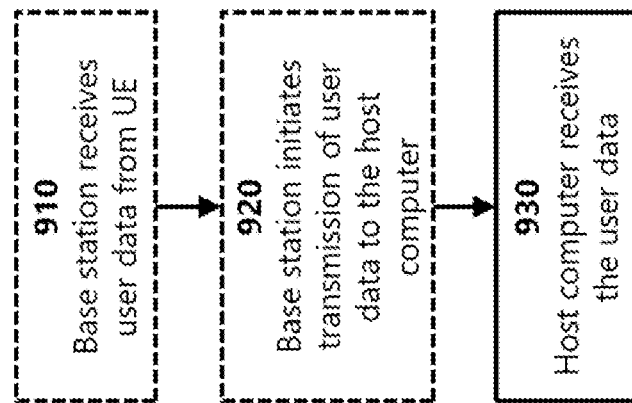
FIG. 12 is a flowchart illustrating a method implemented in a communication system, according to certain embodiments.

FIG. 12 is a flowchart illustrating a method implemented in a communication system, in accordance with one embodiment. The communication system includes a host computer, a base station and a UE which may be those described with reference to FIGS. 7 and 8. For simplicity of the present disclosure, only drawing references to FIG. 12 will be included in this section.

In step 910 (which may be optional), in accordance with the teachings of the embodiments described throughout this disclosure, the base station receives user data from the UE. In step 920 (which may be optional), the base station initiates transmission of the received user data to the host computer. In step 930 (which may be optional), the host computer receives the user data carried in the transmission initiated by the base station.

The term unit may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

Modifications, additions, or omissions may be made to the systems and apparatuses disclosed herein without departing from the scope of the invention. The components of the systems and apparatuses may be integrated or separated. Moreover, the operations of the systems and apparatuses may be performed by more, fewer, or other components. Additionally, operations of the systems and apparatuses may be performed using any suitable logic comprising software, hardware, and/or other logic. As used in this document, "each" refers to each member of a set or each member of a subset of a set.

Modifications, additions, or omissions may be made to the methods disclosed herein without departing from the scope of the invention. The methods may include more, fewer, or other steps. Additionally, steps may be performed in any suitable order.

The foregoing description sets forth numerous specific details. It is understood, however, that embodiments may be practiced without these specific details. In other instances, well-known circuits, structures and techniques have not been shown in detail in order not to obscure the understanding of this description. Those of ordinary skill in the art, with the included descriptions, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to implement such feature, structure, or characteristic in connection with other embodiments, whether or not explicitly described.

Although this disclosure has been described in terms of certain embodiments, alterations and permutations of the embodiments will be apparent to those skilled in the art. Accordingly, the above description of the embodiments does not constrain this disclosure. Other changes, substitutions, and alterations are possible without departing from the scope of this disclosure, as defined by the claims below.

At least some of the following abbreviations may be used in this disclosure. If there is an inconsistency between abbreviations, preference should be given to how it is used above. If listed multiple times below, the first listing should be preferred over any subsequent listing(s).

1×RTT CDMA2000 1× Radio Transmission Technology
3GPP 3rd Generation Partnership Project
5G 5th Generation
5GC 5th Generation Core
CDMA Code Division Multiplexing Access
CGI Cell Global Identifier
CN Core Network
CP Control Plane
CQI Channel Quality information
CSI Channel State Information
DCI Downlink Control Information
DL Downlink
DMRS Demodulation Reference Signal
DRX Discontinuous Reception
DTX Discontinuous Transmission
ECGI Evolved CGI
EDT Early Data Transmission
eMTC Enhanced Machine-Type-Communications
eNB E-UTRAN NodeB
ePDCCH enhanced Physical Downlink Control Channel
EPS Evolved Packet System
E-UTRA Evolved UTRA
E-UTRAN Evolved UTRAN
FDD Frequency Division Duplex
GERAN GSM EDGE Radio Access Network
gNB Base station in NR
GNSS Global Navigation Satellite System
GSM Global System for Mobile communication
HARQ Hybrid Automatic Repeat Request
HO Handover
HSPA High Speed Packet Access
HRPD High Rate Packet Data
IoT Internet of Things
LOS Line of Sight
LPP LTE Positioning Protocol
LTE Long-Term Evolution
M2M Machine-to-Machine
MAC Medium Access Control
MIB Master Information Block
ms millisecond
MT Mobile Terminated
MTC Machine-Type Communications
NGC Next Generation Core
NG-RAN Next Generation Radio Access Network
NPDCCH Narrowband Physical Downlink Control Channel
NPRACH Narrowband Physical Random Access Channel
NAS Non-Access Stratum
NB-IoT Narrowband Internet of Things
NR New Radio
OFDM Orthogonal Frequency Division Multiplexing
OFDMA Orthogonal Frequency Division Multiple Access
PCell Primary Cell
PDCCH Physical Downlink Control Channel
PDSCH Physical Downlink Shared Channel
PLMN Public Land Mobile Network
PRACH Physical Random Access Channel
PRB Physical Resource Block
PRS Positioning Reference Signal
PSS Primary Synchronization Signal
PUCCH Physical Uplink Control Channel
PUSCH Physical Uplink Shared Channel RACH Random Access Channel
RA Random Access
RAN Radio Access Network
RAT Radio Access Technology
RLM Radio Link Management
RNC Radio Network Controller
RNTI Radio Network Temporary Identifier
RRC Radio Resource Control
RRM Radio Resource Management
RS Reference Signal
RSCP Received Signal Code Power
RSRP Reference Symbol Received Power OR Reference Signal Received Power
RSRQ Reference Signal Received Quality OR Reference Symbol Received Quality
RSSI Received Signal Strength Indicator
RSTD Reference Signal Time Difference
SCH Synchronization Channel
SCell Secondary Cell
SDU Service Data Unit
SFN System Frame Number
SGW Serving Gateway
SI System Information
SIB System Information Block
SNR Signal to Noise Ratio
SON Self Optimized Network
SS Synchronization Signal
SSS Secondary Synchronization Signal
TBS Transport Block Size
TDD Time Division Duplex
UE User Equipment
UL Uplink
UP User Plane
UMTS Universal Mobile Telecommunication System
USIM Universal Subscriber Identity Module
UTDOA Uplink Time Difference of Arrival
UTRA Universal Terrestrial Radio Access
UTRAN Universal Terrestrial Radio Access Network
WCDMA Wide CDMA
WLAN Wide Local Area Network

The invention claimed is:

1. A method performed by a wireless device, the method comprising:
monitoring a set of two or more strongest beams over a predefined time period; and
based on an amount of change in the set of two or more strongest beams over the predefined time period,
determining whether the wireless device is stationary or low-mobility,
wherein the change in the set of two or more strongest beams referring to a change in the ordering of the strongest beams over the predetermined time period.

2. The method of claim 1, further comprising:
upon determining the wireless device is stationary or low-mobility, relaxing a radio resource management measurement configuration.

3. The method of claim 1, wherein the change in the set of two or more strongest beams refers to a change in the strongest beams over the predetermined time period.

4. The method of claim 1, wherein the change in the set of two or more strongest beams refers to a change in the signal strength of the strongest beams over the predetermined time period.

5. The method of claim 1, wherein the change in the set of two or more strongest beams refers to a change in antenna panels used by the wireless device over the predetermined time period.

6. The method of claim 1, wherein the wireless device comprises a reduced capacity wireless device.

7. A wireless device comprising processing circuitry, the processing circuitry operable to:
monitor a set of two or more strongest beams over a predefined time period; and
based on an amount of change in the set of two or more strongest beams over the predefined time period,
determine whether the wireless device is stationary or low-mobility,
wherein the change in the set of two or more strongest beams referring to a change in the ordering of the strongest beams over the predetermined time period.

8. The wireless device of claim 7, the processing circuitry further operable to:
upon determining the wireless device is stationary or low-mobility, relax a radio resource management (RRM) measurement configuration.

9. The wireless device of claim 7, wherein the change in the set of two or more strongest beams refers to a change in the strongest beams over the predetermined time period.

10. The wireless device of claim 7, wherein the change in the set of two or more strongest beams refers to a change in the signal strength of the strongest beams over the predetermined time period.

11. A method performed by a wireless device, the method comprising:
monitoring a set of two or more strongest neighbor cells over a predefined time period; and
based on an amount of change in the set of two or more strongest neighbor cells over the predefined time period,
determining whether the wireless device is stationary or low-mobility,
wherein the change in the set of two or more strongest neighbor cells referring to a change in the ordering of the strongest neighbor cells over the predetermined time period.

12. The method of claim 11, further comprising:
upon determining the wireless device is stationary or low-mobility, relaxing a radio resource management (RRM) measurement configuration.

13. The method of claim 11, wherein the change in the set of two or more strongest neighbor cells refers to a change in the strongest neighbor cells over the predetermined time period.

14. The method of claim 11, wherein the change in the set of two or more strongest neighbor cells refers to a change in the signal strength of the strongest neighbor cells over the predetermined time period.

15. The method of claim 11, wherein the change in the set of two or more strongest neighbor cells refers to a change in antenna panels used by the wireless device over the predetermined time period.

16. The method of claim 11, wherein the wireless device comprises a reduced capacity wireless device.

17. A wireless device comprising processing circuitry, the processing circuitry operable to:
monitor a set of two or more strongest neighbor cells over a predefined time period; and
based on an amount of change in the set of two or more strongest neighbor cells over the predefined time period,
determine whether the wireless device is stationary or low-mobility, wherein the change in the set of two or more strongest neighbor cells referring to a change in the ordering of the strongest neighbor cells over the predetermined time period.

* * * * *